United States Patent
Chen et al.

(10) Patent No.: US 8,086,766 B2
(45) Date of Patent: Dec. 27, 2011

(54) SUPPORT FOR NON-LOCKING PARALLEL RECEPTION OF PACKETS BELONGING TO A SINGLE MEMORY RECEPTION FIFO

(75) Inventors: Dong Chen, Yorktown Heights, NY (US); Philip Heidelberger, Yorktown Heights, NY (US); Valentina Salapura, Yorktown Heights, NY (US); Robert M. Senger, Yorktown Heights, NY (US); Burkhard Steinmacher-Burow, Boeblingen (DE); Yutaka Sugawara, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 122 days.

(21) Appl. No.: 12/688,747

(22) Filed: Jan. 15, 2010

(65) Prior Publication Data
US 2011/0179199 A1   Jul. 21, 2011

(51) Int. Cl.
G06F 13/28 (2006.01)
(52) U.S. Cl. ............................... 710/28; 710/22
(58) Field of Classification Search .............. 710/28, 710/22
See application file for complete search history.

(56) References Cited

U.S. PATENT DOCUMENTS

| | | | |
|---|---|---|---|
| 2004/0052258 A1* | 3/2004 | Robertson | 370/392 |
| 2004/0054857 A1* | 3/2004 | Nowshadi | 711/153 |
| 2006/0161694 A1* | 7/2006 | Tomozaki et al. | 710/22 |
| 2009/0006546 A1* | 1/2009 | Blumrich et al. | 709/204 |
| 2009/0006662 A1* | 1/2009 | Chen et al. | 710/22 |
| 2009/0006666 A1* | 1/2009 | Chen et al. | 710/23 |

* cited by examiner

Primary Examiner — Alford Kindred
Assistant Examiner — David Martinez
(74) Attorney, Agent, or Firm — Scully, Scott, Murphy & Presser, P.C.; Daniel P. Morris, Esq.

(57) ABSTRACT

A method and apparatus for distributed parallel messaging in a parallel computing system. A plurality of DMA engine units are configured in a multiprocessor system to operate in parallel, one DMA engine unit for transferring a current packet received at a network reception queue to a memory location in a memory FIFO (rmFIFO) region of a memory. A control unit implements logic to determine whether any prior received packet destined for that rmFIFO is still in a process of being stored in the associated memory by another DMA engine unit of the plurality, and prevent the one DMA engine unit from indicating completion of storing the current received packet in the reception memory FIFO (rmFIFO) until all prior received packets destined for that rmFIFO are completely stored by the other DMA engine units. Thus, there is provided non-locking support so that multiple packets destined for a single rmFIFO are transferred and stored in parallel to predetermined locations in a memory.

22 Claims, 15 Drawing Sheets

US 8,086,766 B2

SUPPORT FOR NON-LOCKING PARALLEL RECEPTION OF PACKETS BELONGING TO A SINGLE MEMORY RECEPTION FIFO

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

This application relates to and claims the benefit of the filing date of commonly-owned, co-pending U.S. Provisional Patent Application Ser. No. 61/293,611 entitled A MULTI-PETASCALE HIGHLY EFFICIENT PARALLEL SUPER-COMPUTER filed on Jan. 8, 2010 and incorporated by reference as if fully set forth herein.

BACKGROUND

The present invention relates to computer systems having multiprocessor architectures and, more particularly, to a system and method for tracking message packets received at nodes of high throughput parallel processing networks.

To achieve high performance computing, multiple individual processors have been interconnected to form a multiprocessor computer system capable of parallel processing. Multiple processors can be placed on a single chip, or several chips—each containing one or more processors—become interconnected to form single- or multi-dimensional computing networks into a multiprocessor computer system, such as described in co-pending U.S. Patent Publication No. 2009/0006808 A1 corresponding to U.S. patent application Ser. No. 11/768,905, the whole contents and disclosure of which is incorporated by reference as if fully set forth herein, describing a massively parallel supercomputing system.

Some processors in a multiprocessor computer system, such as a massively parallel supercomputing system, typically implement some form of direct memory access (DMA) functionality that facilitates communication of messages within and among network nodes, each message including packets containing a payload, e.g., data or information, to and from a memory, e.g., a memory shared among one or more processing elements.

Generally, a uni- or multi-processor system communicates with a single DMA engine to initialize data transfer between the memory and a network device (or other I/O device). However, with increasing bandwidth requirements (and increased number of processors on a chip), a single DMA can not keep up with the volume of message communication operations required for high performance compute and I/O collective operations.

In the art, however, there exists multi-channel DMAs that provide multiple channels from one source to one destination in a time multiplexed manner (such as described in U.S. Pat. No. 6,738,881) and with scheduled ports.

It would be desirable to provide in a multiprocessor system a distributed parallel messaging unit for configuring high throughput networks, for example, that provide for efficient alternate system architectures, for example, star, or point-to-point implementations.

It would be highly desirable to provide a system and method that enables highly optimized high-bandwidth multiprocessors to process packets in parallel.

SUMMARY

In one aspect there is provided an architecture of a distributed parallel messaging unit ("MU") for high throughput networks, wherein a messaging unit at one or more nodes of a network includes a plurality of parallel operating messaging elements ("MEs"). In one embodiment, each ME includes a multi-channel DMA element operating in parallel for handling both message transmission (injection) and message reception operations. The architecture supports parallel packet reception that minimizes the use of a locking mechanism.

According to one aspect, there is provided a messaging system and method for receiving messages in a parallel computing device having a plurality of nodes, each node having multiple processor units and an associated memory operatively connected therewith via an interconnect device, the messaging system comprising at each node:
a plurality of receiver devices for receiving message packets from a network, a network reception queue associated with a receiver device, each network reception queue adapted to buffer said received packet, a reception control unit for receiving information from a processor at a node for handling of packets received over a network; and, a plurality of DMA engine units, each unit operatively connected with the reception control unit and configured to operate in parallel, one DMA engine unit for transferring a current packet received at a network reception queue to a memory location in a reception memory FIFO (rmFIFO) of the associated memory in a reception memory FIFO based on said information, said control unit implementing logic to determine whether any prior received packet for that reception memory FIFO is still in a process of being stored in said associated memory by another DMA engine unit of said plurality, and prevent said one DMA engine unit to indicate completion of storing said current packet until all prior received packets associated with that reception memory FIFO are completely stored by said other DMA engine units, wherein multiple packets belonging to a single rmFIFO are transferred and stored in parallel to predetermined locations in said associated memory.

Further to this aspect, the information specified by the control unit includes address pointers to locations in the associated memory where data received from a current packet is to be stored, the pointers including a first pointer specifying a location starting address of a next packet in the rmFIFO and, a second pointer that indicates complete storing of that packet, wherein, the one DMA engine unit accessing the control unit to request update of a corresponding second pointer when storage of the current received packet is completed by that DMA engine, the control unit logic configured to track using the first and second pointers whether any prior received packet associated with that rmFIFO is still in a process of being stored in the memory, and preventing the one DMA engine unit to update the second pointer until all prior received packets for that rmFIFO are completely stored by a DMA engine.

There is additionally provided a method for receiving messages in a parallel computing system having a plurality of nodes, each node having multiple processor units and an associated memory operatively connected therewith via an interconnect device, the method comprising: receiving, at a network receiver device of a plurality of network receiver devices, a current packet associated with a message and storing said packet at a network reception queue; accessing, by at least one parallel operating DMA engine unit of a plurality of DMA engine units, a reception control unit providing information from a processor at a node for handling of packets received over a network; and, transferring, via one of said at least one parallel operating DMA engine unit, the current received packet from the network reception queue to a memory location in a reception memory FIFO (rmFIFO) in the associated processor memory based on said information; implementing logic, at said control unit, to determine whether any prior received packet destined for that rmFIFO is still in a process of being stored in said associated memory by another DMA engine unit of said at least one DMA engine units; and, preventing the one of said at least one parallel operating DMA engine unit to indicate completion of storing said current packet until all prior received packets destined thr that same rmFIFO are completely stored by said other DMA engine units, wherein multiple packets destined for that same rmFIFO are transferred and stored in parallel to predetermined locations in said associated memory.

Further to this method, the information specified by the control unit includes address pointers to locations in the associated memory where data received from a current packet is to be stored, the pointers including a first pointer specifying a location starting address of a next packet in the rmFIFO and, a second pointer that indicates complete storing of that packet, the method further comprising: accessing, by the one of the at least one parallel operating DMA engine unit, the control unit to request updating of a corresponding second pointer when storage of the current received packet is completed by that DMA engine unit, determining, by the control unit logic, using the first and second pointers whether any prior received packet associated with that rmFIFO is still in a process of being stored in the memory, and preventing the one DMA engine unit to update the second pointer until all prior received packets are completely stored by a DMA engine.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

Figure 1:
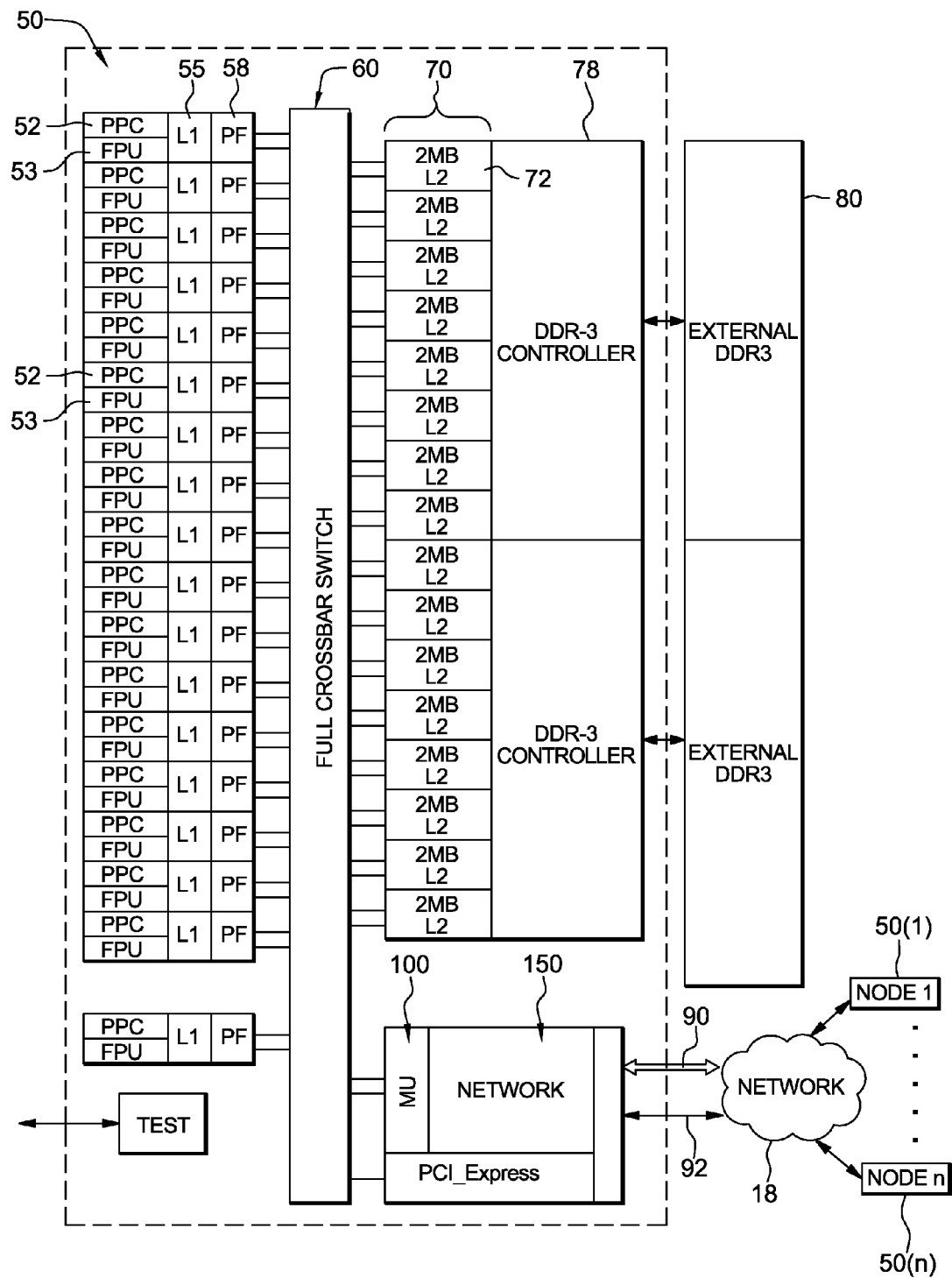
FIG. 1 depicts a schematic of a computing nodechip employing a Messaging Unit including DMA functionality for a massively parallel computing system according to one embodiment.

A high throughput network includes distributed parallel messaging units ("MU"), wherein a messaging unit at each of a plurality of nodes of such network includes a plurality of messaging elements ("MEs"). Each ME includes a multi-channel direct memory access (DMA) element operating in parallel for handling both message transmission (injection) and message reception operations. In the distributed parallel messaging unit (MU) architecture, each ME implementing parallel DMA functionality operates under distributed control: not a single processor or control state machine coordinates the parallel operation of the MEs, but rather data control initiates simultaneous operation of a plurality of MEs for both message reception and injection.

The Multiple distributed physical MEs are not time shared, i.e., the multiple MEs per node share a single chip interconnect port and the MEs operate in parallel controlled by data flow without implementing control logic for time-sharing.

The multiple MEs per node share network switch and intra-processor switch, and configuration logic, and further, the MEs serve multiple network interfaces (single network, or on multiple different networks, or local copy). Multiple MEs per node thus can work on the same message, and physically, can be MEs integrated within a single node, or on a single chip.

In a multiprocessor system having distributed messaging units (MUs) each having multiple DMAs (messaging elements, MEs), packets belonging to the same message, or packets targeted to the same processor could be received at different DMAs. To achieve high throughput, not all packets need to be processed by a single DMA, but instead the packets can be processed in parallel on different DMAs, i.e., multiple MEs can receive and process packets belonging to the same message. Multiple MEs can also receive and process packets belonging to different messages in parallel.

Some messages, such as a memory FIFO message to be described in greater detail herein below, include information in each packet to place the packet into an area of memory called a reception memory FIFO (rmFIFO), which is a circular buffer. There are pointers in the MU describing where this FIFO starts and ends, and where the head and tail of the rmFIFO is. Processors can read the head and tail and then read the packets in the rmFIFO. It is a requirement by software that packets be stored contiguously within the (circular) rmFIFO and that all packets between the head and tail pointers, as seen by the processors, have been completely received.

When multiple DMAs are receiving and processing packets destined to the same rmFIFO, each of the multiple DMAs need to access and update the same control structure(s) simultaneously to keep track of memory area where received packets belonging to the same rmFIFO are saved. For example, a later received packet can be finished processing before the earlier started processing completed. Each packet is placed in the memory area with some offset to its starting address. The ability for software running on the node processors to always know what is the last data area with data received for further processing is now provided in one embodiment of the invention.

FIG. 1 depicts a schematic of a single network compute node 50 in a parallel computing system having a plurality of like nodes each node employing a Messaging Unit 100 according to one embodiment. The computing node 50 for example may be one node in a parallel computing system architecture such as a BluGene®/Q massively parallel computing system comprising 1024 compute nodes 50(1), . . . 50(n), each node including multiple processor cores and each node connectable to a network such as a torus network, or a collective.

A compute node of this present massively parallel supercomputer architecture and in which the present invention may be employed is illustrated in FIG. 1. The compute nodechip 50 is a single chip ASIC ("Nodechip") based on low power processing core architecture, though the architecture can use any low power cores, and may comprise one or more semiconductor chips. In the embodiment depicted, the node employs PowerPC® A2 at 1600 MHz, and support a 4-way multi-threaded 64b PowerPC implementation. Although not shown, each A2 core has its own execution unit (XU), instruction unit (IU), and quad floating point unit (QPU or FPU) connected via an AXU (Auxiliary eXecution Unit). The QPU is an implementation of a quad-wide fused multiply-add SIMD QPX floating point instruction set architecture, producing, for example, eight (8) double precision operations per cycle, for up to 128 floating point operations per cycle per compute chip. QPX is an extension of the scalar PowerPC floating point architecture. It includes multiple, e.g., thirty-two, 32B-wide floating point registers per thread.

As described herein, one use of the letter "B" represents a Byte quantity, e.g., 2B, 8B, 32B, and 64B represent Byte units. Recitations "GB" represent Gigabyte quantities.

More particularly, the basic nodechip 50 of the massively parallel supercomputer architecture illustrated in FIG. 1 includes multiple symmetric multiprocessing (SMP) cores 52, each core being 4-way hardware threaded supporting transactional memory and thread level speculation, and, including the Quad Floating Point Unit (FPU) 53 on each core. In one example implementation, there is provided sixteen or seventeen processor cores 52, plus one redundant or back-up processor core, each core operating at a frequency target of 1.6 GHz providing, for example, a 563 GB/s bisection bandwidth to shared L2 cache 70 via an interconnect device 60, such as a full crossbar switch. In one example embodiment, there is provided 32 MB of shared L2 cache 70, each of sixteen cores core having associated 2 MB of L2 cache 72 in the example embodiment. There is further provided external DDR SDRAM (e.g., Double Data Rate synchronous dynamic random access) memory 80, as a lower level in the memory hierarchy in communication with the L2. In one embodiment, the compute node employs or is provided with 8-16 GB memory/node. Further, in one embodiment, the node includes 42.6 GB/s DDR3 bandwidth (1.333 GHz DDR3) (2 channels each with chip kill protection).

Each FPU 53 associated with a core 52 provides a 32B wide data path to the L1-cache 55 of the A2, allowing it to load or store 32B per cycle from or into the L1-cache 55. Each core 52 is directly connected to a private prefetch unit (level-1 prefetch, L1P) 58, which accepts, decodes and dispatches all requests sent out by the A2. The store interface from the A2 core 52 to the L1P 55 is 16B wide, in one example embodiment, and the load interface is 32B wide, both operating at processor frequency. The L1P 55 implements a fully associative, 32 entry prefetch buffer, each entry holding an L2 line of 128B size, in one embodiment. The L1P provides two prefetching schemes for the private prefetch unit 58: a sequential prefetcher, as well as list prefetcher.

As shown in FIG. 1, the shared L2 70 may be sliced into 16 units, each connecting to a slave port of the crossbar switch device (XBAR) switch 60. Every physical address is mapped to one slice using a selection of programmable address bits or a XOR-based hash across all address bits. The L2-cache slices, the L1Ps and the L1-D caches of the A2s are hardware-coherent. A group of four slices may be connected via a ring to one of the two DDR3 SDRAM controllers 78.

Network packet I/O functionality at the node is provided and data throughput increased by implementing MU 100. Each MU at a node includes multiple parallel operating DMA engines, each in communication with the XBAR switch, and a Network Interface unit 150. In one embodiment, the Network interface unit of the compute node includes, in a non-limiting example: 10 intra-rack and inter-rack interprocessor links 90, each operating at 2.0 GB/s, that, in one embodiment, may be configurable as a 5-D torus, for example); and, one I/O link 92 interfaced with the Network interface Unit 150 at 2.0 GB/s (i.e., a 2 GB/s I/O link (to an I/O subsystem)) is additionally provided.

Figure 2:
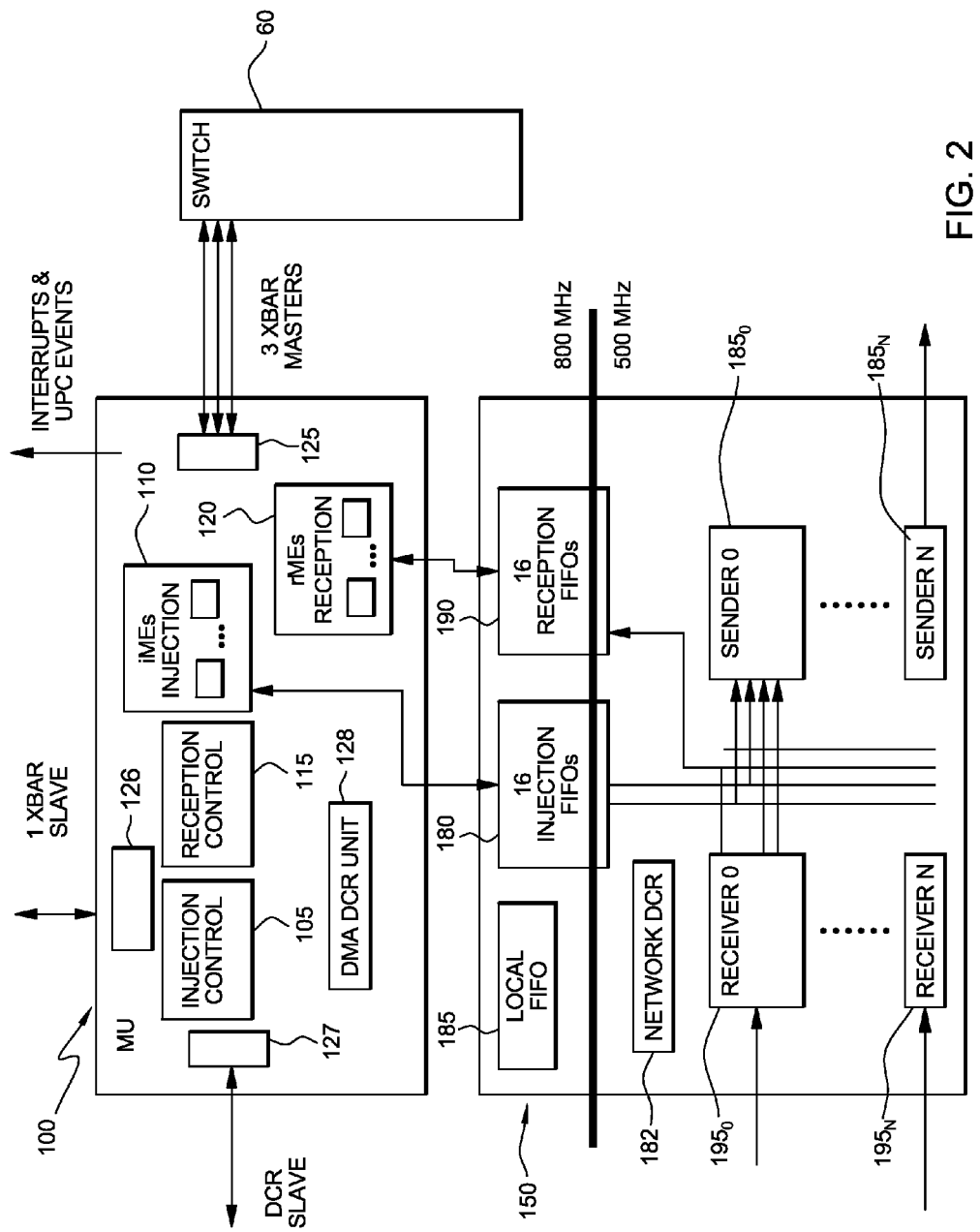
FIG. 2 is a top level architecture of the Messaging Unit 100 interfacing with the Network interface Unit 150 according to one embodiment.

The top level architecture of the Messaging Unit 100 interfacing with the Network interface Unit 150 is shown in FIG. 2. The Messaging Unit 100 functional blocks involved with packet injection control as shown in FIG. 2 includes the following: an Injection control unit 105 implementing logic for queuing and arbitrating the processors' requests to the control areas of the injection MU; and, a plurality of Injection iMEs (injection Message Elements) 110 that read data from L2 cache or DDR memory and insert it in the network injection FIFOs 180, or in a local copy FIFO 185. In one embodiment, there are 16 iMEs 110, one for each network injection FIFO 180. The Messaging Unit 100 functional blocks involved with packet reception control as shown in FIG. 2 include a Reception control unit 115 implementing logic for queuing and arbitrating the requests to the control areas of the reception MU; and, a plurality of Reception rMEs (reception Message Elements) 120 that read data from the network reception FIFOs 190, and insert them into L2. In one embodiment, there are 16 rMEs 120, one for each network reception FIFO 190. A DCR control Unit 128 is provided that includes DCR (control) registers for the MU 100.

As shown in FIG. 2, the herein referred to Messaging Unit, "MU" such as MU 100 implements plural direct memory access engines to offload the network interface 150. In one embodiment, it transfers blocks via three switch master ports 125 between the L2-caches 70 (FIG. 2) and the reception FIFOs 190 and injection FIFOs 180 of the network interface unit 150. The MU is additionally controlled by the cores via memory mapped I/O access through an additional switch slave port 126.

In one embodiment, one function of the messaging unit 100 is to ensure optimal data movement to, and from the network into the local memory system for the node by supporting injection and reception of message packets. As shown in FIG. 2, in the network interface 150 the injection FIFOs 180 and reception FIFOs 190 (sixteen for example) each comprise a network logic device for communicating signals used for controlling routing data packets, and a memory for storing multiple data arrays. Each injection FIFOs 180 is associated with and coupled to a respective network sender device $185_n$ (where n=1 to 16 for example), each for sending message packets to a node, and each network reception FIFOs 190 is associated with and coupled to a respective network receiver device $195_n$ (where n=1 to 16 for example), each for receiving message packets from a node. A network DCR (device control register) 182 is provided that is coupled to the injection FIFOs 180, reception FIFOs 190, and respective network receivers 195, and network senders 185. A complete description of the DCR architecture is available in IBM's Device Control Register Bus 3.5 Architecture Specifications Jan. 27, 2006, which is incorporated by reference in its entirety. The network logic device controls the flow of data into and out of the injection FIFO 180 and also functions to apply 'mask bits' supplied from the network DCR 182. In one embodiment, the ME elements communicate with the network FIFOs in the Network interface unit 150 and receives signals from the network reception FIFOs 190 to indicate, for example, receipt of a packet. It generates all signals needed to read the packet from the network reception FIFOs 190. This network interface unit 150 further provides signals from the network device that indicate whether or not there is space in the network injection FIFOs 180 for transmitting a packet to the network and can also be configured to write data to the selected network injection FIFOs.

The MU 100 further supports data prefetching into the memory, and on-chip memory copy. On the injection side, the MU splits and packages messages into network packets, and sends packets to the network respecting the network protocol. On packet injection, the messaging unit distinguishes between packet injection, and memory prefetching packets based on certain control bits in its associated message descriptor. A memory prefetch mode is supported in which the MU fetches a message into L2, but does not send it. On the reception side, it receives packets from a network, and writes them into the appropriate location in memory, depending on control information stored in the packet. On packet reception, the messaging unit 100 distinguishes between three different types of packets, and accordingly performs different operations. The types of packets supported are: memory FIFO packets, direct put packets (also called remote puts), and remote get packets.

With respect to on-chip local memory copy operation, the MU copies content of an area in the local memory to another area in the memory. For memory-to-memory on chip data transfer, a dedicated SRAM buffer, located in the network device, is used. Remote get (packets) and the corresponding direct put (packets), in one embodiment, can be "paced" by software to reduce contention within the network. In this software-controlled paced mode, a remote get for a long message is broken up into multiple remote gets, each for a sub-message. The sub-message remote get is allowed to enter the network if the number of packets belonging to the paced remote get active in the network is less than an allowed threshold. To reduce contention in the network, software executing in the cores in the same nodechip can control the pacing.

The MU 100 further includes an Interface to a cross-bar (XBAR) switch 60 in additional implementations. The MU 100 includes three (3) Xbar master devices 125 to sustain network traffic and one Xbar slave 126 for programming. The three (3) Xbar masters 125 may be fixedly mapped to the Injection iMEs (injection Message Elements) 110, such that for example, the iMEs are evenly distributed amongst the three ports to avoid congestion. A DCR slave interface unit 127 providing control signals is also provided.

The handover between network device 150 and MU 100 is performed via buffer memory, e.g., 2-port SRAMs, for network injection/reception FIFOs. The MU 100, in one embodiment, reads/writes one port using, for example, an 800 MHz clock (operates at one-half the speed of a processor core clock, e.g., at 1.6 GHz, or clock/2, for example), and the network reads/writes the second port with a 500 MHz clock (2.0 GB/s network), for example. The bandoliers are handled using the network FIFOs and FIFOs' pointers (which are implemented using latches, for example).

Figure 3:
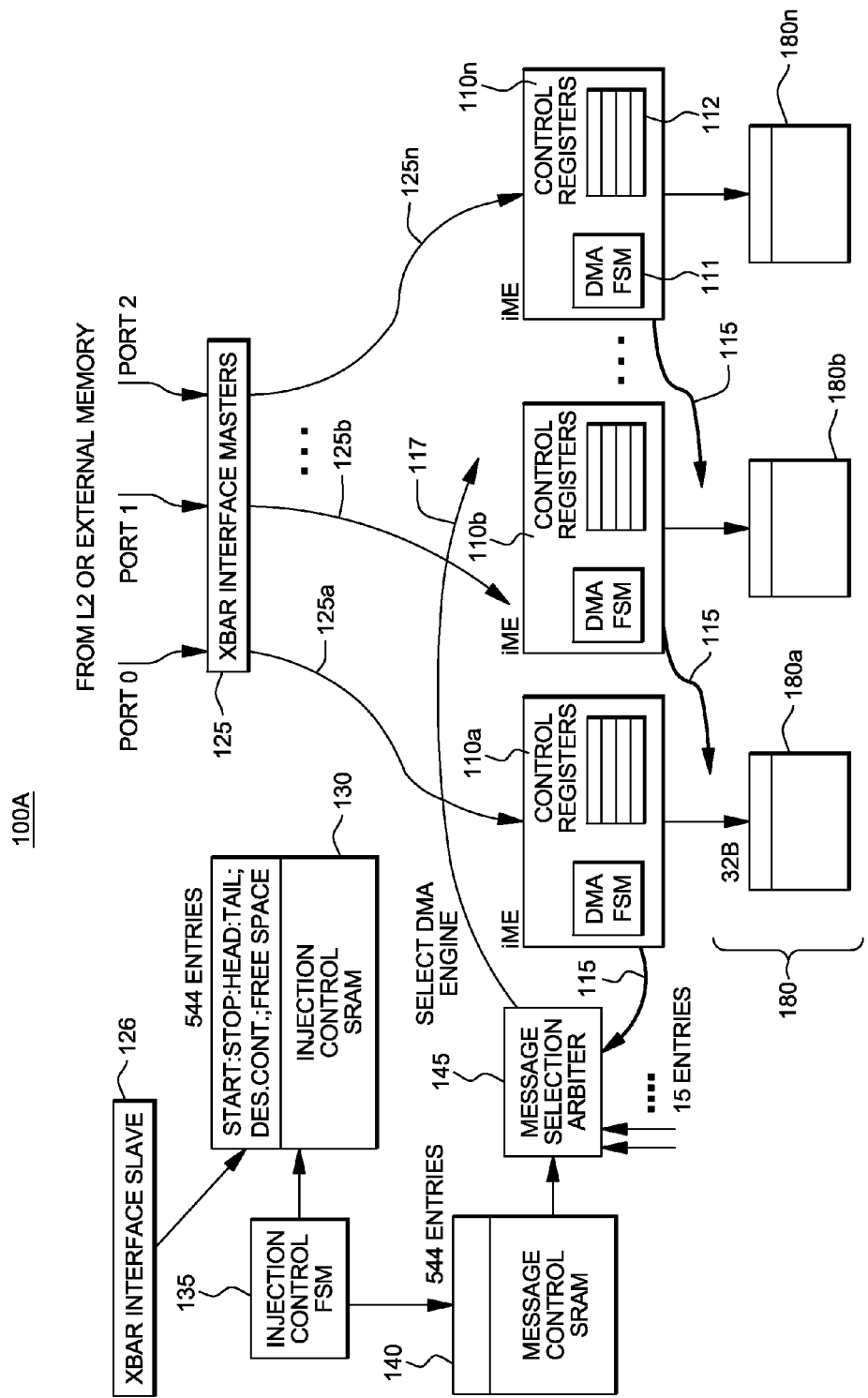
FIG. 3 is a high level schematic of the Messaging Unit 100A of FIG. 2 employing multiple parallel operating DMA engines for network packet injection according to one embodiment.

As shown in FIG. 3 illustrating a more detailed schematic of the Messaging Unit 100A of FIG. 2 employing multiple parallel operating DMA engines for network packet injection, the MU 100 to XBAR master interface 125 runs at a predetermined speed (e.g., clock/2), and, in one embodiment, all signals are latch bound. The XBAR write width is 16 bytes, or about 12.8 GB/s peak write bandwidth per XBAR interface master port in the example embodiment. In this embodiment, to sustain a 2*10 GB/s=20 GB/s 5-D torus nearest neighbor bandwidth, three (3) XBAR masters providing ports 125a, 125b, 125c are needed. To program MU internal registers for the reception and injection sides, one XBAR interface slave is used 126.

As further shown in FIG. 3, there are multiple iMEs (Injection Messaging Elements) 110a,110b, . . . , 110n in correspondence with the number of network injection FIFOs, however, other implementations are possible. In the embodiment of the MU injection side 100A depicted, there are sixteen iMEs 110 for each network injection FIFO. Each of the iMEs 110a, 110b, . . . , 110n includes a DMA element including an injection control state machine 111, and injection control registers 112. Each iMEs 110a, 110b, . . . , 110n initiates reads from the message control SRAM to obtain the packet header and other information, initiates data transfer from the memory and, write back updated packet header into the message control SRAM 140. The control registers 112 each holds packet header information, e.g., a subset of packet header content, and other information about the packet currently being moved. The DMA injection control state machine 111 initiates reads from the message control SRAM 140 to obtain the packet header and other information, and then it initiates data transfer from the memory, e.g., L2 cache, to a network injection FIFO.

In an alternate embodiment, to reduce size of each control register 112 at each node, only a small portion (e.g., defining an unnecessary portion or part of a packet header) of packet information is stored in each iME that is necessary to generate requests to switch 60. Without holding a full packet header, an iME may require less than 100 bits of storage. Namely, each iME 110 holds main memory address that holds message data packet size, and miscellaneous attributes.

Header data is sent from the message control SRAM 140 to the network injection FIFO directly; thus the iME alternatively does not hold packet headers in registers. The Network interface 150 provides signals from the network device to indicate whether or not there is space available in the paired network injection FIFO. It also writes data to the selected network injection FIFOs.

As shown in FIG. 3, the Xbar interface master and arbiter unit 125 generates external connection to Xbar for the L2 controller (not shown) to read data from the L2, and transfer received data to the correct iME/network interface. To reduce the size of the hardware implementation, in one embodiment, iMEs 110 are grouped into clusters, e.g., clusters of four, and then it pairs (assigns) one or more clusters of iMEs to a single Xbar master read port. At most one iME per Xbar port can issue a read request on any cycle for up to three (3) simultaneous requests (in correspondence to the number of master ports, e.g., three (3) master ports, e.g., 125a-125c). On the read data return side, one iME can receive return data on each master port. In this embodiment of MU injection side 100A, it is understood that more than three iMEs can be actively processing at the same time, but on any given clock cycle three can be requesting or reading data from the XBAR switch 60, in the embodiment depicted. The injection control SRAM 130 is also paired with one of the three master ports, e.g., 125a-125c, so that it can fetch message descriptors from memory, i.e., Injection memory FIFOs. In one embodiment, each iME has its own request and acknowledgement signal lines connected to the corresponding XBAR master. The request signal is from iME to XBAR master, and the acknowledgement signal is from XBAR master to iME. When an iME wants to read main memory, it asserts the request signal. The XBAR master selects one of iMEs requesting to read main memory (if any). When XBAR master accepts a request, it asserts the acknowledgement signal to the requesting iME. In this way iME knows when the request is accepted. The injection control SRAM has similar signals connected to a XBAR master (i.e. request and acknowledgement signals). The master ports treats the injection control SRAM in the same way as an iME.

FIG. 3 further shows internal injection control status registers 112 implemented at each iME of the MU device that receive control status data from Message control SRAM. These injection control status registers include, but are not limited to, registers for storing the following: control status data including a main memory address that holds message data, packet size, and miscellaneous attributes. Based on the control status data, iME will read message data via the XBAR master and store it in the network injection FIFO.

FIG. 3 depicts in greater detail those elements of the injection side MU device 100A for handling the transmission (packet injection) for the MU 100. Messaging support including packet injection involves packaging messages into network packets and, sending packets respecting network protocol. The network protocol includes point-to-point and collective. In the point-to-point protocol, the packet is sent directly to a particular destination node. On the other hand, in the collective protocol, some operations (e.g. floating point addition) are performed on payload data across multiple packets coming from different sender nodes, and then the resulting data is sent to a receiver node.

For packet injection, the Xbar interface slave 126 programs injection control by accepting write and read request signals from processors to program SRAM, e.g., an Injection FIFO Control SRAM (ICSRAM) 130 of the MU 100 that is mapped to the processor memory space, and is ECC protected. In one embodiment, Xbar interface slave processes all requests from the processor in-order of arrival. The Xbar interface masters 125a,125b, 125c generate connection to the Xbar switch 60 for the L2 controller to read data from the L2 or external memory, and transfers received data to the selected iME element for injection, e.g., transmission into a network.

The ICSRAM 130 particularly receives message descriptor information (e.g., in 64B message descriptor units) from a processor desirous of sending a message. The processor first writes a message descriptor to a buffer location in processor memory, referred to herein as injection memory FIFO (imFIFO) (not shown). The imFIFO(s) implemented at the node memory, are implemented as circular buffers having slots for receiving message descriptors and having a start address (indicating the first address that this imFIFO can hold a descriptor), imFIFO size (from which the, end address can be calculated), and including associated head and tail pointers to be specified to the MU. In one embodiment, at each compute node, there are 17 "groups" of imFIFOs, for example, with 32 imFIFOs per group for a total of 544, in an example embodiment. In addition, these groups may be sub-grouped, e.g., 4 subgroups per group. This allows software to assign processors and threads to groups or subgroups. For example, in one embodiment, there are 544 imFIFOs to enable each thread on each core to have its own set of injection FIFOs. Some imFIFOs may be used for remote gets and for local copy. It is noted that any processor can be assigned to any group.

Returning to FIG. 3, the message descriptor associated with the message to be injected is requested by the Injection control state machine 135 via the Xbar master interface 125. Once retrieved from memory, the requested descriptor returns via the Xbar master interface 125 and is sent to the message control SRAM 140 for local storage.

The message descriptor further includes a message interrupt bit to instruct the message unit to send an interrupt to the processor when the last (and only last) packet of the message has been received. For example, when the MU injection side sends the last packet of a message, it sets an interrupt bit. When an rME receives a packet and sees this bit set in the header, it will raise an interrupt.

In a methodology implemented by the MU for sending message packets, ICSRAM 130 holds information including the start address, remaining size of the imFIFO buffer, a head address, a tail address, count of fetched descriptors, and free space remaining in the injection memory FIFO (i.e., start, size, head, tail, descriptor count and free space).

In one aspect, the Injection control state machine 135 detects the state when an injection memory FIFO is non-empty, and initiates copying of the message specific information of the message descriptor to the message SRAM control block 140. That is, the state machine logic 135 monitors all write accesses to the Injection control SRAM. When it is written, the logic reads out start, size, head, and tail pointers from the SRAM and check if the imFIFO is non-empty. Specifically, an imFIFO is non-empty if the tail pointer is not equal to the head pointer. The Message control SRAM block 140 includes information (received from the imFIFO) used for injecting a message to the network including, for example, a message start address, message size in bytes, and first packet header. This Message control SRAM block 140 is not memory-mapped (it is used only by the MU itself), however, is ECC protected.

The Message selection arbiter unit 145 receives the message specific information from each of the message control SRAM 140, and receives respective signals 115 from each of the iME engines 110a, 110b, . . . , 110n. Based on the status of each respective iME, Message selection arbiter unit 145 determines if there is any message waiting to be sent, and pairs it to an available iME engine 110a, 110b, . . . , 110n, for example, by issuing an iME engine selection control signal 117. If there are multiple messages which could be sent, messages may be selected for processing in accordance with a pre-determined priority as specified, for example, as bits in the packet header. The priority is decided based on the virtual channel. Thus, for example, a system message may be selected first, then a message with high-priority, then a normal priority message is selected. If all messages to be sent are of the same priority, a message may be selected randomly, and assigned to the selected iME engine. In every clock cycle, one message can be selected and assigned.

Reception

Figure 4:
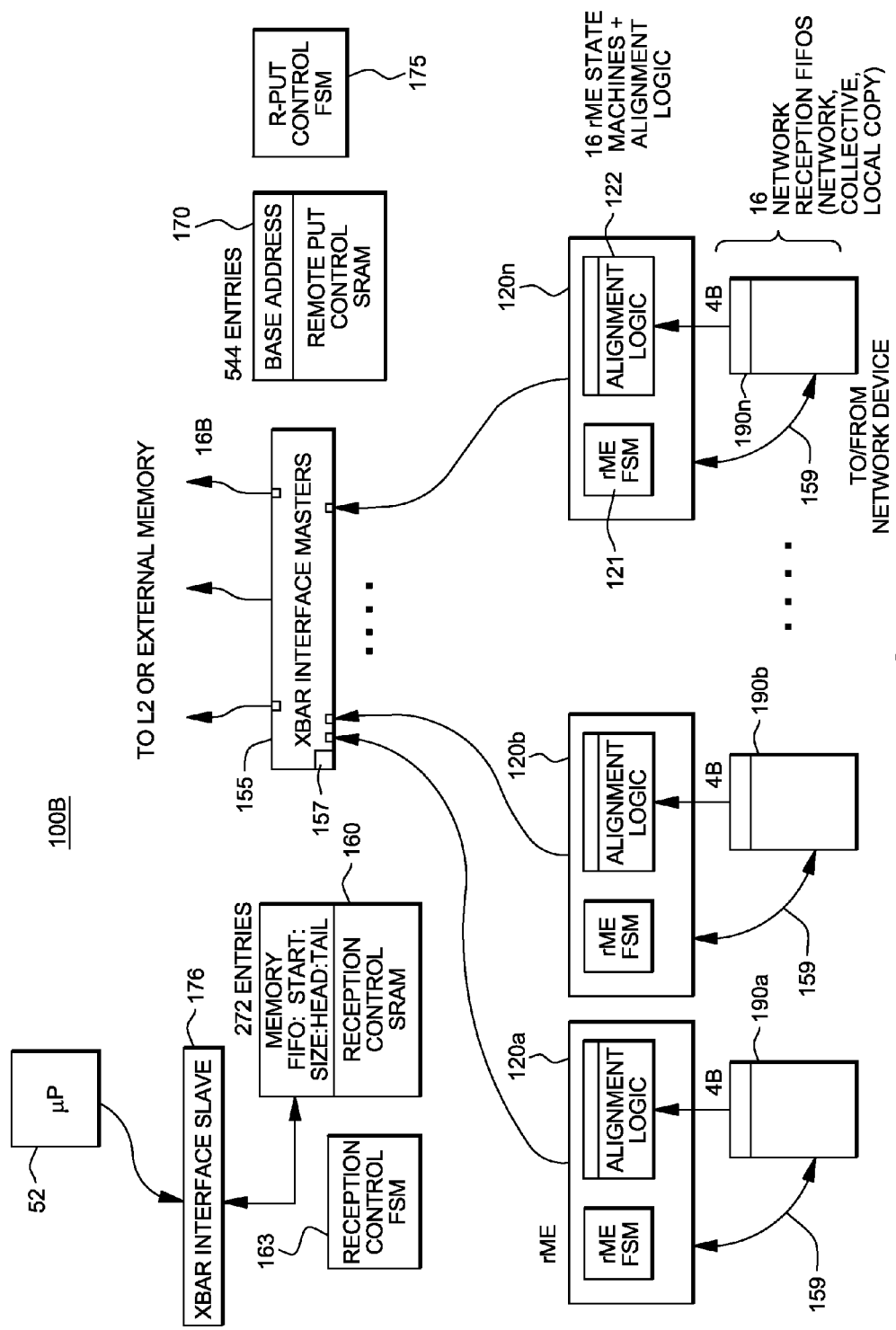
FIG. 4 is a high level schematic of the Messaging Unit 100B of FIG. 2 employing multiple parallel operating DMA engines for network packet reception according to one embodiment.

FIG. 4 depicts a high level diagram of the MU device 100B for handling the packet reception side of the MU 100. Reception operation includes receiving packets from the network and writing them into the memory and or L2 cache. Packets are received at network reception FIFOs 190a, 190b, . . . , 190n. In one embodiment, the network reception FIFOs are associated with torus network, collective, and local copy operations. In one implementation, n=16, however, other implementations are possible. The memory of the compute node includes a set of reception memory FIFO (rmFIFO) areas, such as rmFIFO 199 shown in FIG. 4A, where packets received from the network are moved. In one embodiment, there are sixteen (16) rmFIFOs assigned to each processor core, however, other implementations are possible.

As shown in FIG. 4, reception side MU device 100B includes multiple rMEs (Reception Messaging Elements) 120a, 120b, ..., 120n. In one embodiment, n=16, however, other implementations are possible. Generally, at the MU reception side 100B, there is an rME for each network reception FIFO. Each of the rMEs contains a DMA reception control state machine 121, byte alignment logic 122, and control/status registers (not shown). In the rMEs 120a, 120b, ..., 120n, the DMA reception control state machine 121 detects that a paired network FIFO is non-empty, and if it is idle, it obtains the packet header, initiates reads to an SRAM (either 130, 160, or 170 depending on packet type), and controls data transfer to the node memory, e.g., including the transferring of payload data to memory and atomic memory counter update in the case of a direct Put, and it generates an interrupt, if selected. The Byte alignment logic 122 ensures that the data to be written to the memory are aligned, in one embodiment, on a 32B boundary for memory FIFO packets, or on any byte alignment specified, e.g., for put packets.

In one embodiment, storing of data to XBAR master is via 16-byte unit and be 16-byte aligned. The requestor rME can mask some bytes, i.e., it can specify which bytes in the 16-byte data are actually stored. The role of alignment logic is to place received data in the appropriate position in a 16-byte data line. For example: an rME needs to write 20-byte received data to main memory address 35 to 54. In this case 2 write requests are necessary: 1) The alignment logic builds the first 16-byte write data. The $1^{st}$ to $13^{th}$ received bytes are placed in byte 3 to 15 in the first 16-byte data. Then the rME tells the XBAR master to store the 16-byte data to address 32, but not to store the byte 0, 1, and 2 in the 16-byte data. As a result, byte 3 to 15 in the 16-byte data (i.e. $1^{st}$ to $13^{th}$ received bytes) will be written to address 35 to 47 correctly. Then the alignment logic builds the second 16-byte write data. The $14^{th}$ to $20^{th}$ received bytes are placed in byte 0 to 6 in the second 16-byte data. Then the rME tell the XBAR master to store the 16-byte data to address 48, but not to store byte 7 to 15 in the 16-byte data. As a result, the $14^{th}$ to $20^{th}$ received bytes will be written to address 48 to 54 correctly.

Although not shown, control registers are provided that store part of the packet header and control information when needed for packet reception. Packet reception control status registers may include, but are not limited to, the following registers: Reception control SRAM (Memory mapped); Status registers (Memory mapped); and R-put control SRAM (Memory mapped).

In operation, when one of the network reception FIFOs receives a packet, the network device generates a signal 159 for receipt at the paired rME 120 to inform the paired rME that a packet is available. In one aspect, the rME reads the packet header from the network FIFO, and parses the header to identify the type of the packet received. There are three different types of packets: memory FIFO packets, direct put packets (also called remote puts), and remote get packets. The type of packet is specified by bits in the packet header, as described below, and determines how the packets are processed. Received memory FIFO packets are placed in the memory of the node, e.g., for processor consumption.

In one aspect, for Direct put messaging, data from network Direct put messages processed by the reception side MU device 100B are put in specified memory locations. Information is provided in the packet to inform the rME of where in memory the packet data is to be written. In Remote get messaging, the MU device 100B initiates sending of data from the receiving node to some other node.

Other elements of the reception side MU device 100B includes the Xbar interface slave block 156 programmed to perform reception control. It accepts write and read requests from a processor and updates SRAM values such as Reception Control SRAM (RCSRAM) 160 or Remote—Put Control SRAM 170 values. Further, the Xbar interface slave block 156 provides data for reads. In one embodiment, slave block 156 processes all requests in-order of arrival. More particularly, the Xbar interface master 155 generates a connection to the Xbar switch 60 to write data to the DDR memory or L2 cache memory 70, e.g., at an L2 controller. Xbar interface master 155 also includes an arbiter unit 157 for arbitrating between multiple rMEs (reception Messaging Element) 120a, 120b, ... 120n. In one aspect, as multiple rMEs compete for a XBAR master to store data, the XBAR arbiter 157 of the XBAR master 155 decides which rME to select. Various algorithms can be used for selecting an rME. In one embodiment, the XBAR arbiter selects an rME based on the priority. The priority is decided based on the virtual channel of the packet the rME is receiving. (e.g., "system" and "system collective" have the highest priority, "high priority" and "usercommworld" have the next highest priority, and the others have the lowest priority). If there are multiple requesting rMEs that have the same priority, one of them may be selected randomly.

As in the MU injection side of FIG. 3, a three port Xbar interface master 155 may be used.

In one embodiment, a cluster of five or six rMEs may be paired to a single Xbar write port (there can be two or more clusters of five or six rMEs). In this embodiment, one rME per Xbar port may write on any cycle for up to three simultaneous write operations. Note that more than three rMEs can be active processing packets at the same time, but on any given cycle only three can be writing to the switch.

The reception control SRAM 160 is written to include pointers (start, size minus one, head, commit tail, and advanced tail) and counters (commit ID, and advanced ID) for rmFIFOs, and further, is mapped in the memory address space and is ECC protected. A reception control state machine 163 arbitrates access to reception control (RC) SRAM between multiple rMEs and processor requests, and it updates memory FIFO pointers stored at the RCSRAM. As will be described in further detail below, a remote Put (R-Put) control SRAM 170 includes control information for put packets (base address for data, or for a counter device (not shown)). This R-Put control SRAM is mapped in the memory address space, and is ECC protected. R-Put control state machine 175 arbitrates access to R-put control SRAM between multiple rMEs and processor requests. In one embodiment, the arbiter mechanism employed alternately grants an rME and the processor an access to the R-put control SRAM. If there are multiple rMEs requesting access, the arbiter selects one of them randomly, i.e., there is no priority difference among rMEs in one embodiment.

Figure 5:
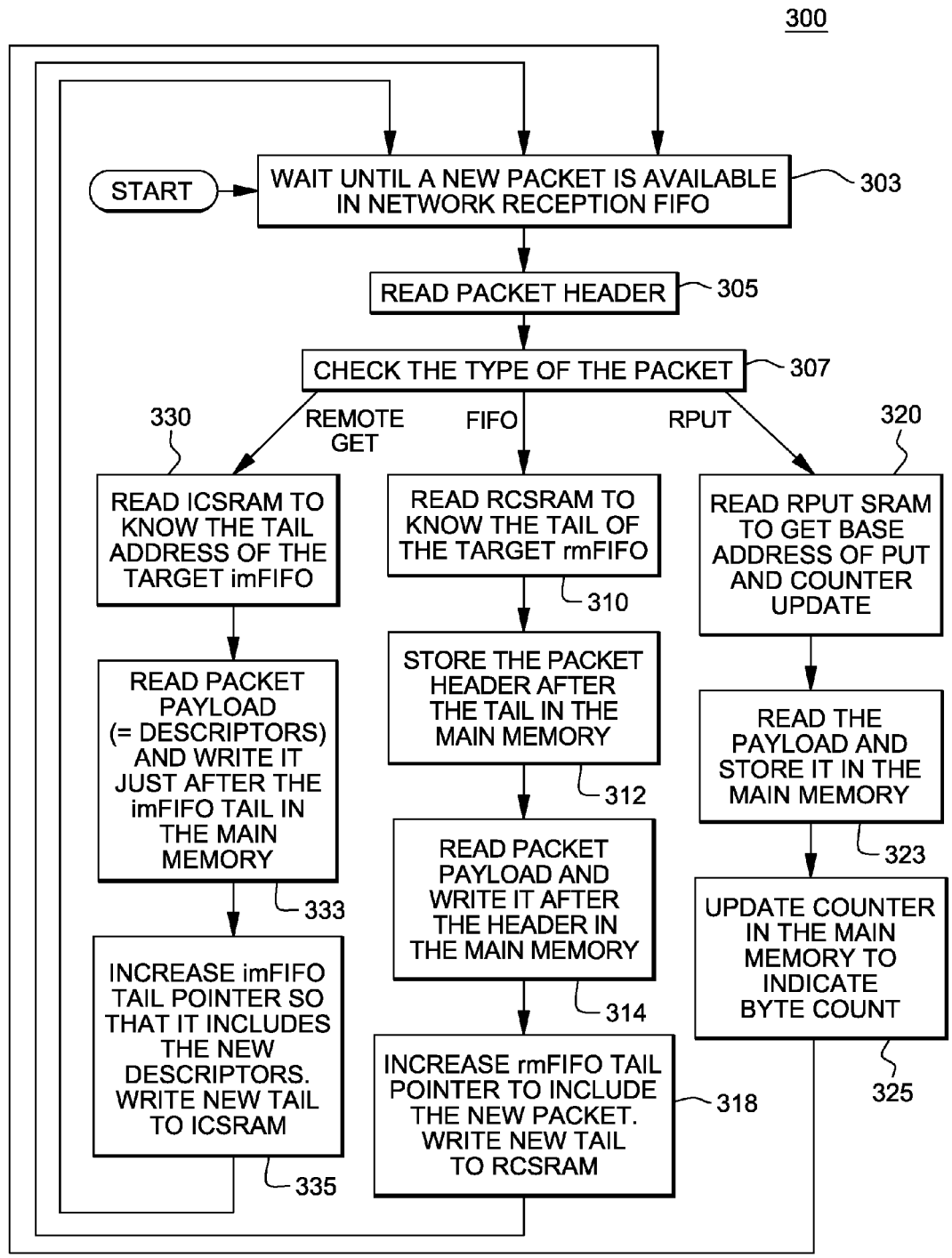
FIG. 5 depicts a methodology 300 for describing the operation of parallel operating rME 120a, 120b, . . . 120n for packet reception side according to one embodiment.

FIG. 5 depicts a methodology 300 for describing the operation of an rME 120a, 120b, ... 120n as configured for parallel operation. As shown in FIG. 5, at 303, the rME is idle waiting for reception of a new packet in a network reception FIFO 190a, 190b, ..., 190n. Then, at 305, having received a packet, the header is parsed and read by the respective rME to determine where the packet is to be copied or moved. At 307, the type of packet is determined so subsequent packet processing can proceed accordingly. Thus, for example, in the case of memory FIFO packets, processing proceeds at the rME at step 310 et seq.; in the case of direct put packets, processing proceeds at the rME at step 320 et seq.; and, for the case of remote get packets, processing proceeds at the rME at step 330 et seq.

Figure 4A:
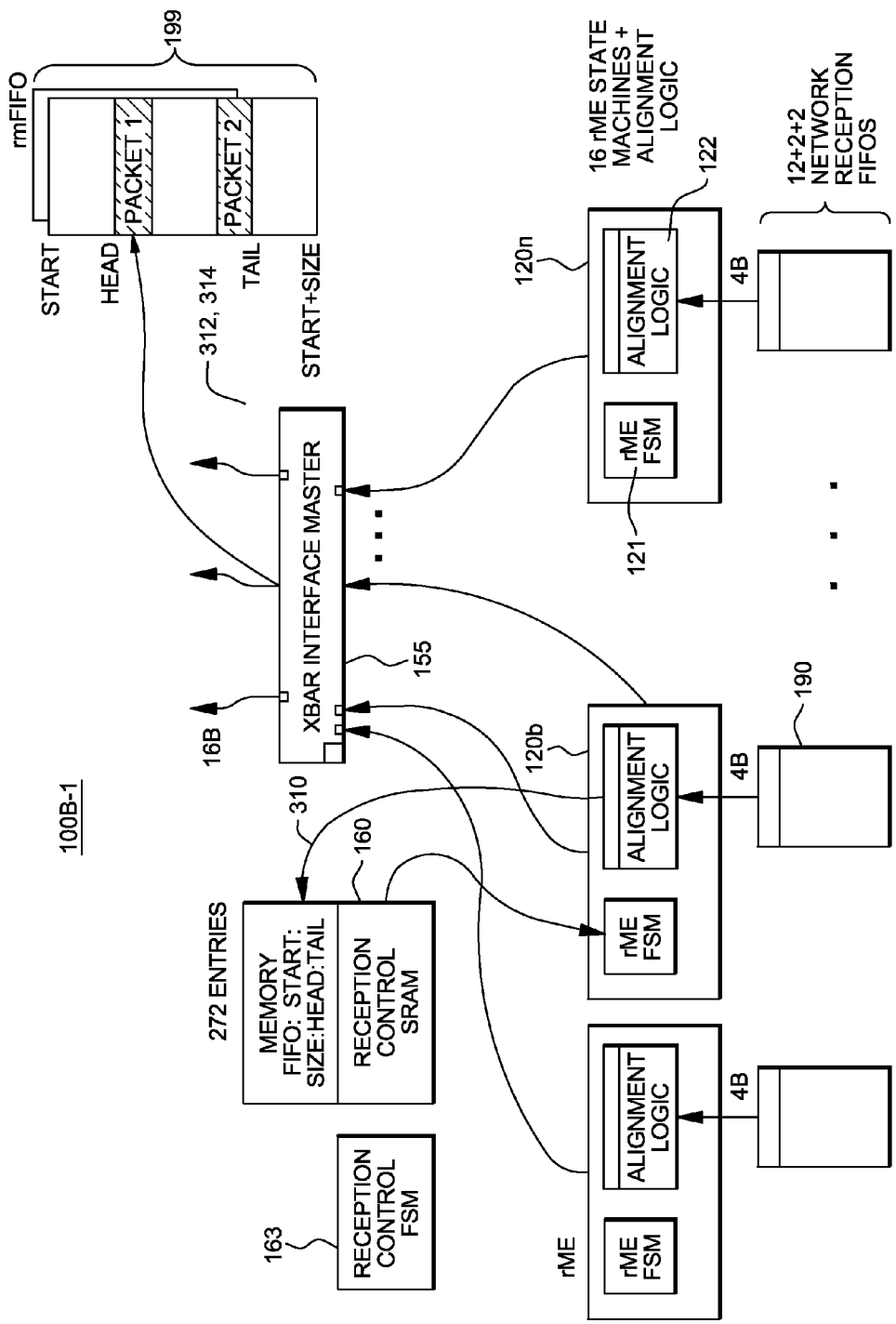
FIG. 4A depicts detailed operation of the MU device 100B-1 for processing received Memory FIFO packets according to one embodiment.

In the case of memory FIFO packet processing, in one embodiment, FIFO memory packets include a reception memory FIFO ID field in the packet header that specifies the destination rmFIFO in memory. The rME of the MU device 100B parses the received packet header to obtain the location of the destination rmFIFO. As shown in FIG. 4A depicting operation of the MU device 100B-1 for processing received Memory FIFO packets, these Memory FIFO packets are to be copied into the rmFIFOs 199 identified by the memory FIFO ID. Packets processed by an rME can target any rmFIFO. Particularly, as shown in FIG. 4A and FIG. 5 at step 310, the rME initiates a read of the Reception control SRAM 160 for that identified memory FIFO ID, and, based on that ID, a pointer to the tail of the corresponding rmFIFO in memory (reception memory FIFO tail) is read from the reception control SRAM at 310. Then, the rME writes the received packet, via the Xbar master 155, to the pointed to reception memory FIFO, e.g., in 16B write chunks. In one embodiment, the rME moves both the received packet header and the payload into the memory location starting at the tail pointer. For example, as shown at 312, the packet header of the received memory FIFO packet is written, via the Xbar master 155, to the memory after the tail in the rmFIFO memory 199 and, at 314, the packet payload is read and stored in the rmFIFO memory after the header. Upon completing the copy of the packet to the memory, the rME updates the tail pointer and can optionally raise an interrupt, if the interrupt is enabled for that memory FIFO and an interrupt bit in the packet header is set. In one embodiment, the tail is updated for number of bytes in the packets atomically. That is, as shown at 318, the tail pointer of the rmFIFO memory is increased to include the new packet, and the new tail pointer is written to the RCS-RAM 160. Thus, for Memory FIFO packets, the rmFIFOs can be thought of as a simple producer-consumer queue: rMEs are the producers who move packets from network FIFOs into the memory, and the processor cores are the consumers who use them. The consumer (processor core) advances a header pointer, and the producer (rME) advances a tail pointer.

Figure 7:
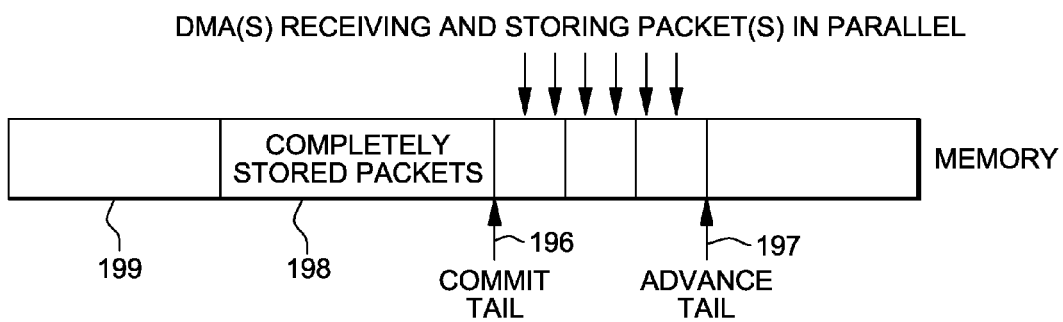
Figure 7A:
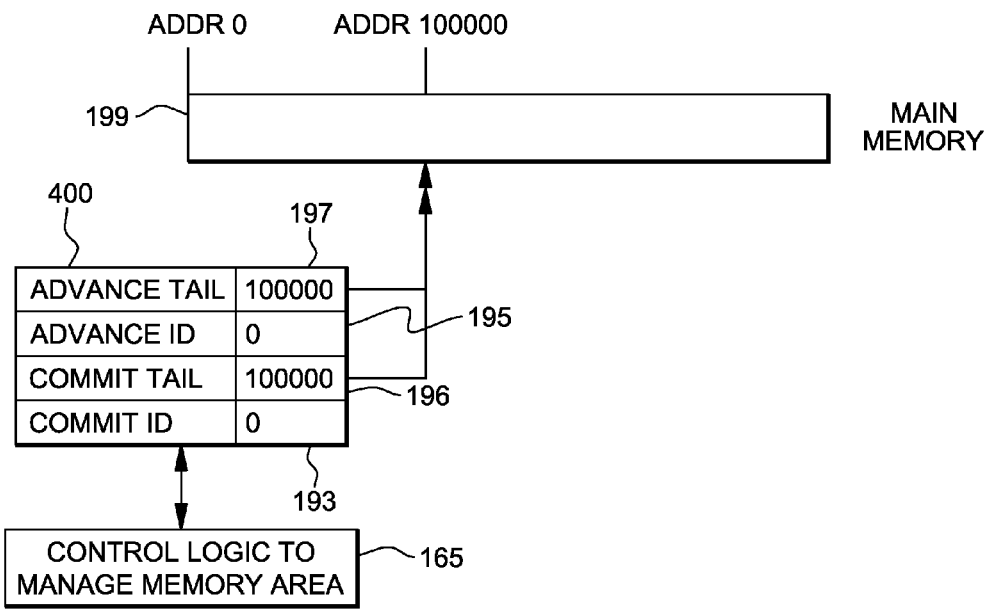

As shown in FIG. 7A, in one embodiment, to allow simultaneous usage of the same rmFIFO by multiple rMEs, each rmFIFO 199 further has an associated advance tail 197, committed tail 196, and two counters: one advance tail ID counter 195 associated with advance tail 197; and, one committed tail ID counter 193 associated with the committed tail 196. An rME 120b includes a DMA engine that copies packets to the memory buffer (e.g., FIFO) 199 starting at a slot pointed to by an advance tail pointer 197 in an SRAM memory, e.g., the RCSRAM 160 and obtains an advance tail ID. After the packet is copied to the memory, the rME 120 checks the committed tail ID to determine if all previously received data for that rmFIFO have been copied. If determined that all previously received data for that rmFIFO have been copied, the rME atomically updates both committed tail and committed tail ID, otherwise it waits. A control logic device 165 shown in FIG. 7A implements logic to manage the memory usage, e.g., manage respective FIFO pointers, to ensure that all store requests for header and payload have been accepted by the interconnect 60 before atomically updating committed tail (and optionally issuing interrupt). For example, in one embodiment, each rME $120_a, \ldots 120_n$, ensures that all store requests for header and payload have been accepted by the interconnect 60 before updating commit tail (and, optionally issuing an interrupt). In one embodiment, there are interconnect interface signals issued by the control logic device that tell MU that a store request has been accepted by the interconnect, i.e., an acknowledgement signal. This information is propagated to the respective rMEs. Thus, each rME is able to ensure that all interesting store requests have been accepted by the interconnect. An "optional" interrupt may be used by the software on the cores to track the FIFO free space and may be raised when the available space in an rmFIFO falls below a threshold (such as may be specified in a DCR register). For this interrupting, the control logic 165 asserts some interrupt lines that are connected to cores (directly or via a GEA (Global Event Aggregator) engine).

In one embodiment, the control logic device 165 processing may be external to both the L2 cache and MU 100. Further, in one embodiment, the Reception control SRAM includes associated status and control registers that maintain and atomically update these advance tail ID counter, advance tail, committed tail ID counter, committed tail pointer values in addition to fields maintaining packet "start" address, "size minus one" and "head" fields.

When a MU wants to read from or write to main memory, it accesses L2 memory controller via the xbar master ports. If the access hits L2, the transaction completes within the L2 and hence no actual memory access is necessary. On the other hand, if it doesn't hit, L2 has to request the memory controller (e.g., DDR-3 Controller 78, FIG. 1) to read or write main memory.

FIG. 7 illustrates conceptually a reception memory FIFO 199 or like memory storage area showing a plurality of slots including some completely filled packets 198 and after the most recent slot pointed to by a commit tail address (commit tail) 196 and further showing multiple DMA engines (e.g., each from respective rMEs) having placed or placing packets received after the last packet pointed to by the commit tail pointer (last committed packet) in respective locations. The advance tail address (advance tail) 197 points to the address the next new packet will be stored.

When a DMA engine implemented in a rME wants to store a packet, it obtains from the RC SRAM 160 the advance tail 197 which points to the next memory area in that reception memory FIFO 199 to store a packet (Advance tail address). Then, the advance tail is then moved (incremented) for next packet. The read of advance tail and the increment of advance tail both occur at the same time and cannot be intervened, i.e. they happen atomically. After the DMA at the rME has stored the packet, it requests an atomic update of the Commit tail pointer to indicate that the last address packets have been completely stored. The Commit tail may be referred to by software to know up to where there are completely stored packets in the memory area (e.g., software checks commit tail and the processor may read packets in the main memory up to the commit tail for further processing.) DMAs write commit tail in the same order as they get advance tail. Thus, the commit tail will have the last address correctly. To manage and guarantee this ordering between DMAs, advance ID and commit ID are used.

Figure 7B:
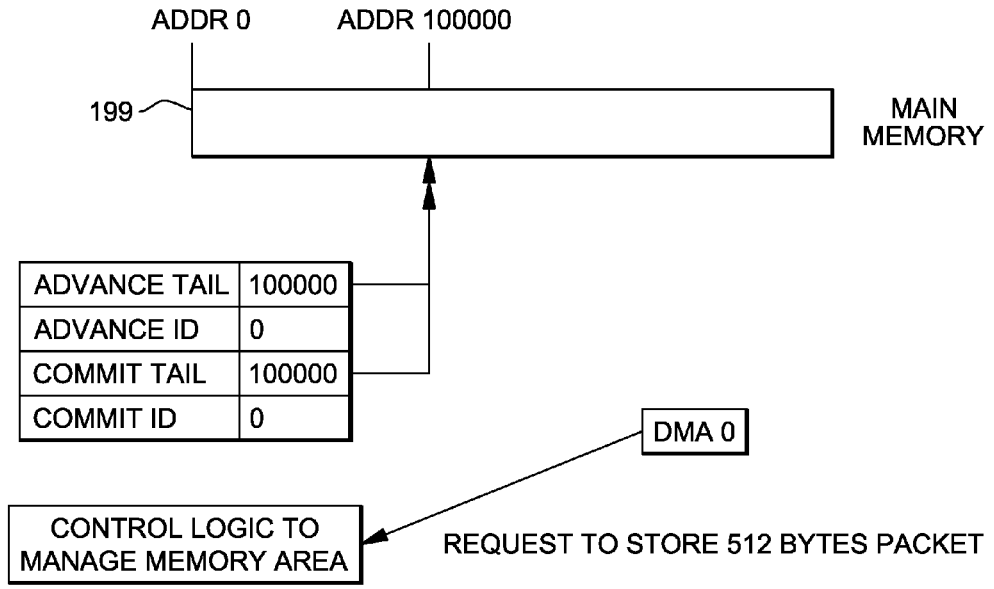
Figure 7C:
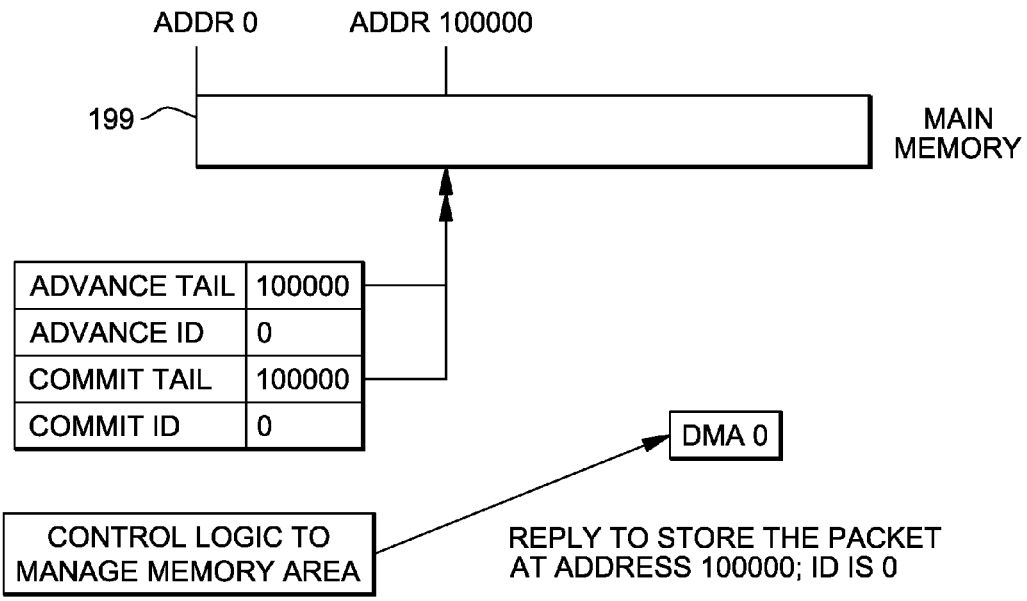
Figure 7D:
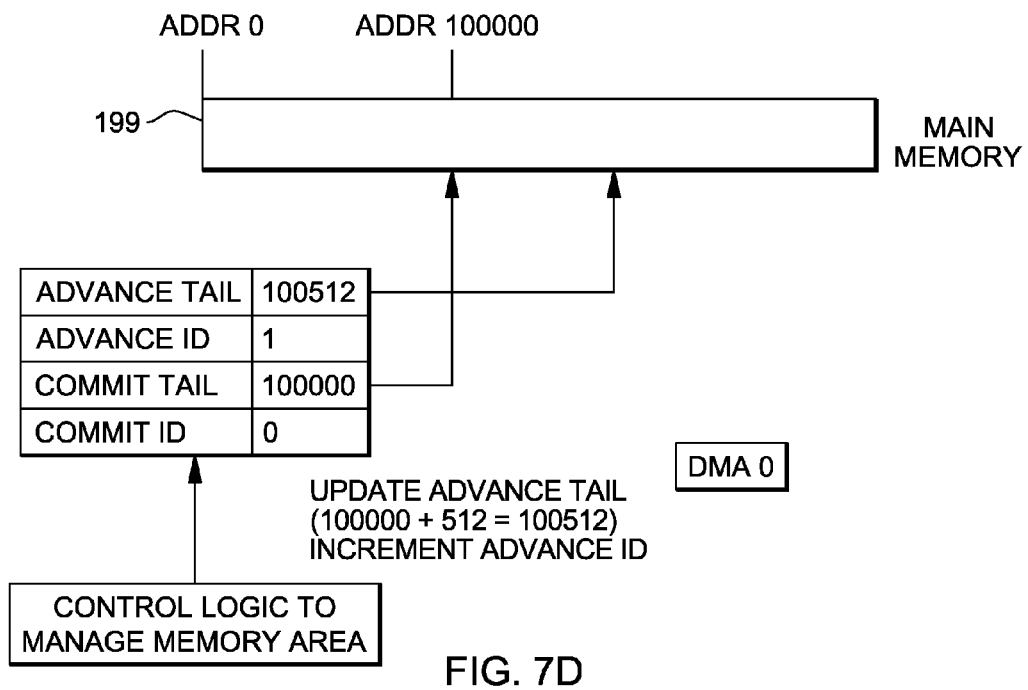
Figure 7E:
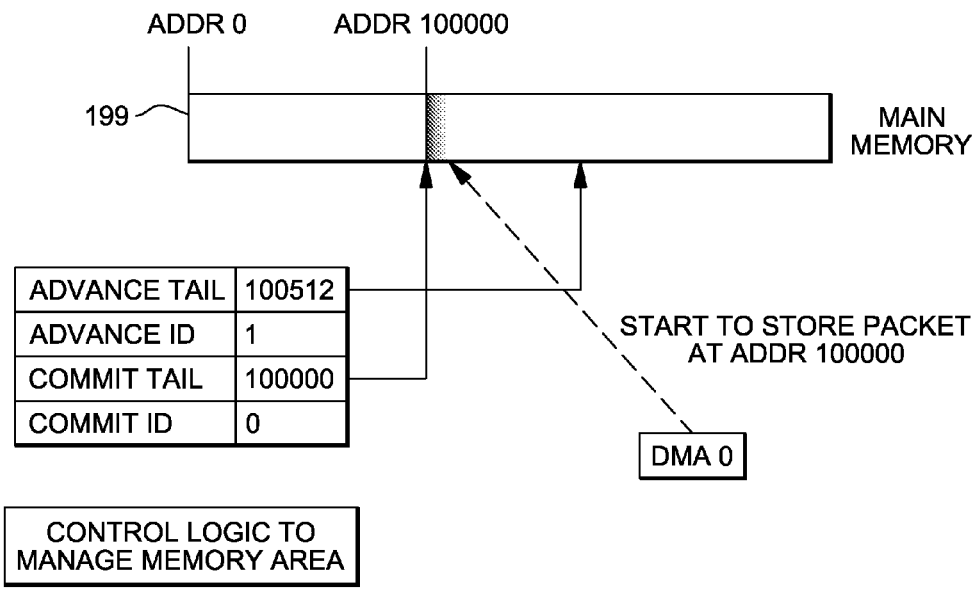
Figure 7F:
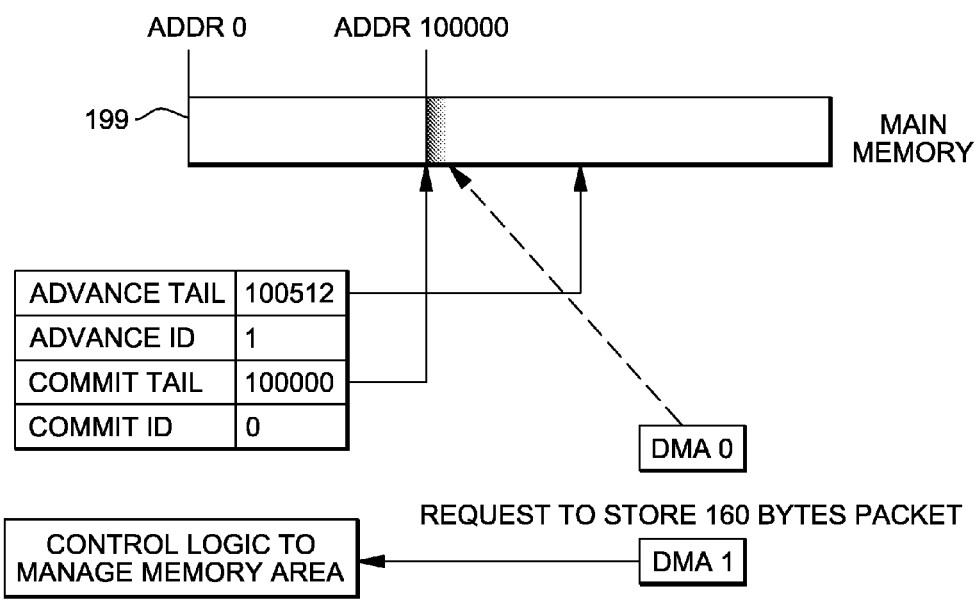
Figure 7G:
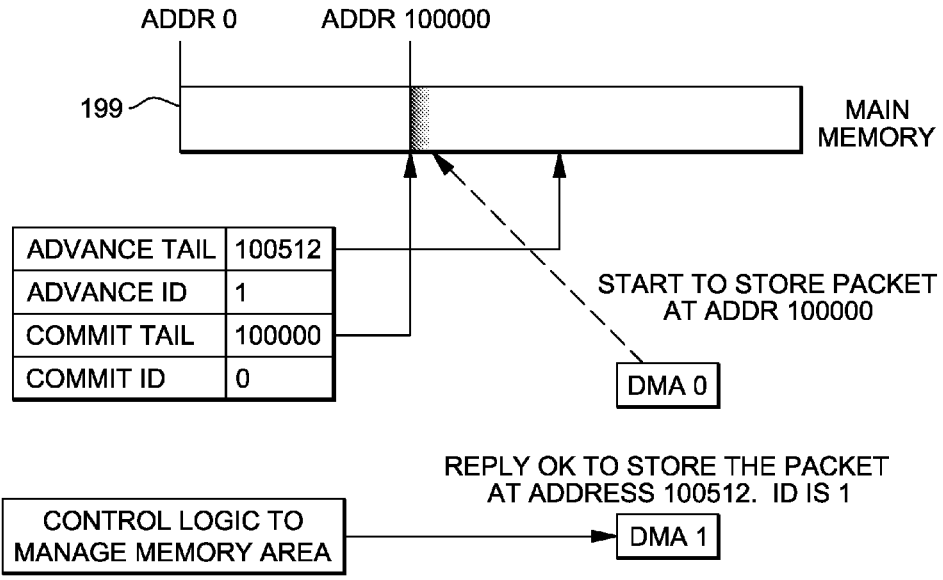
Figure 7H:
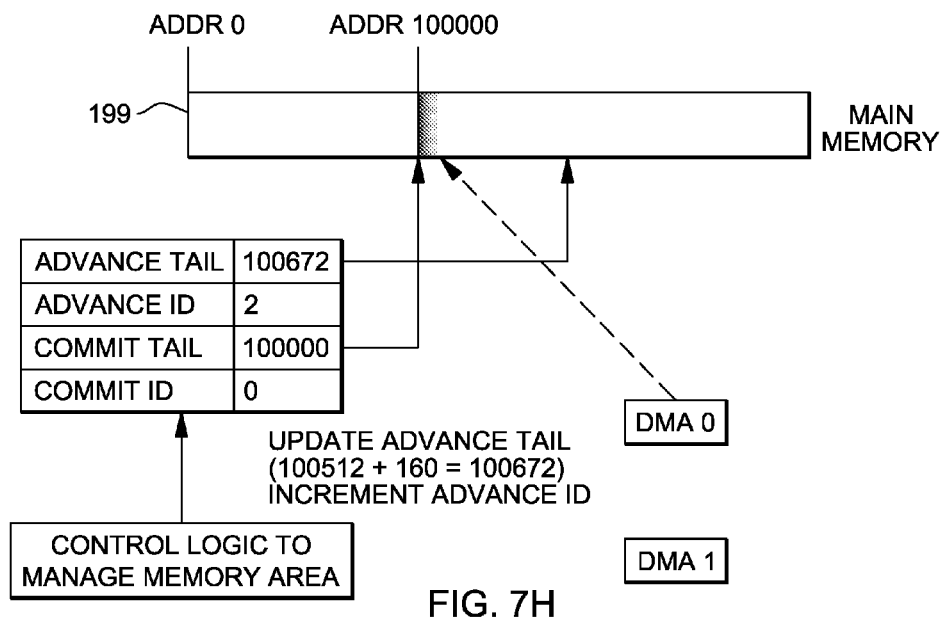
Figure 7I:
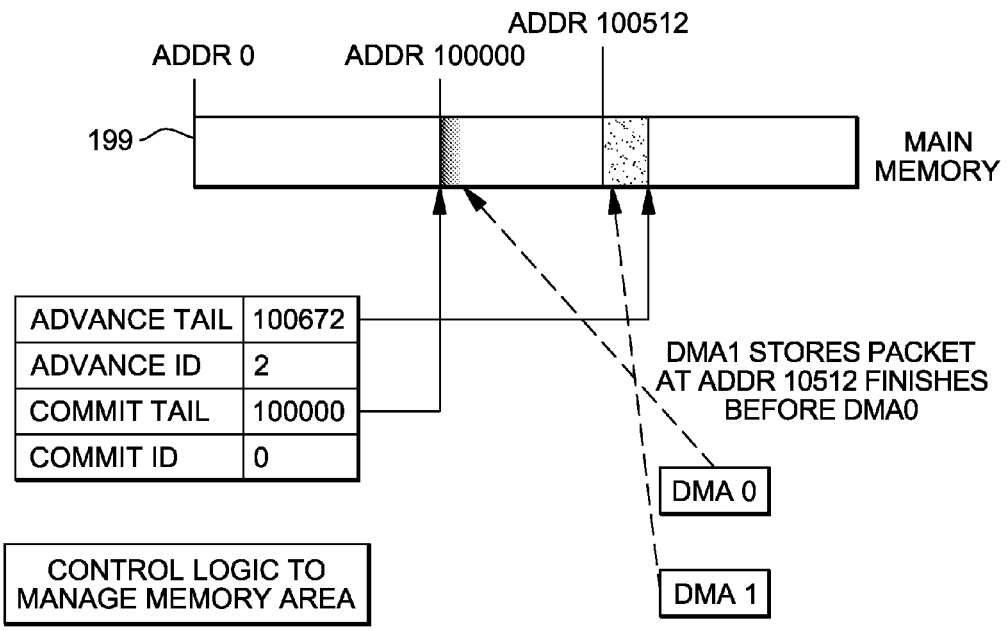
Figure 7J:
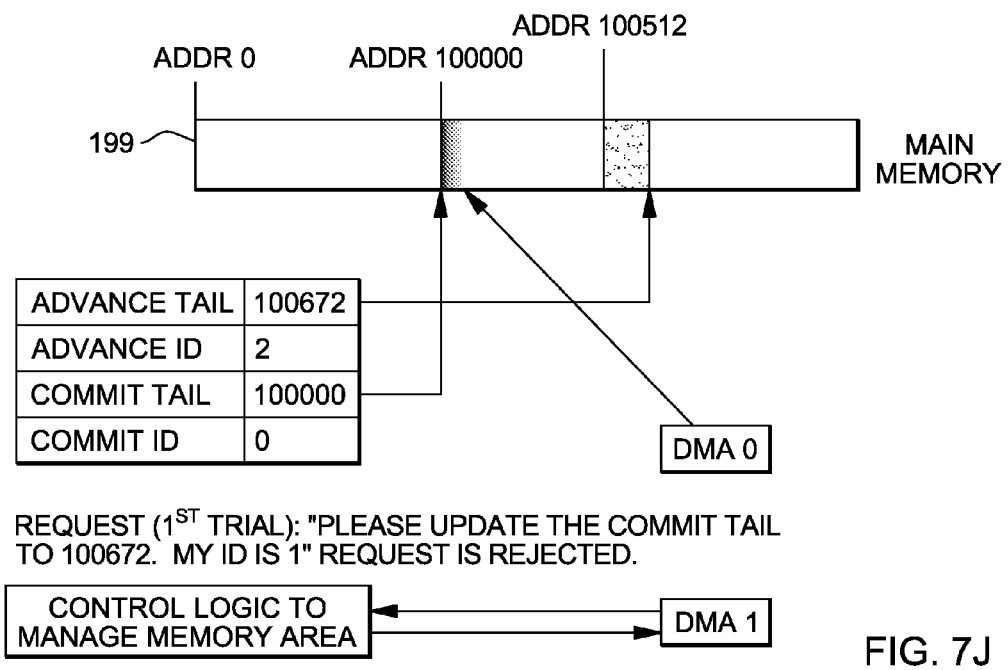
Figure 7K:
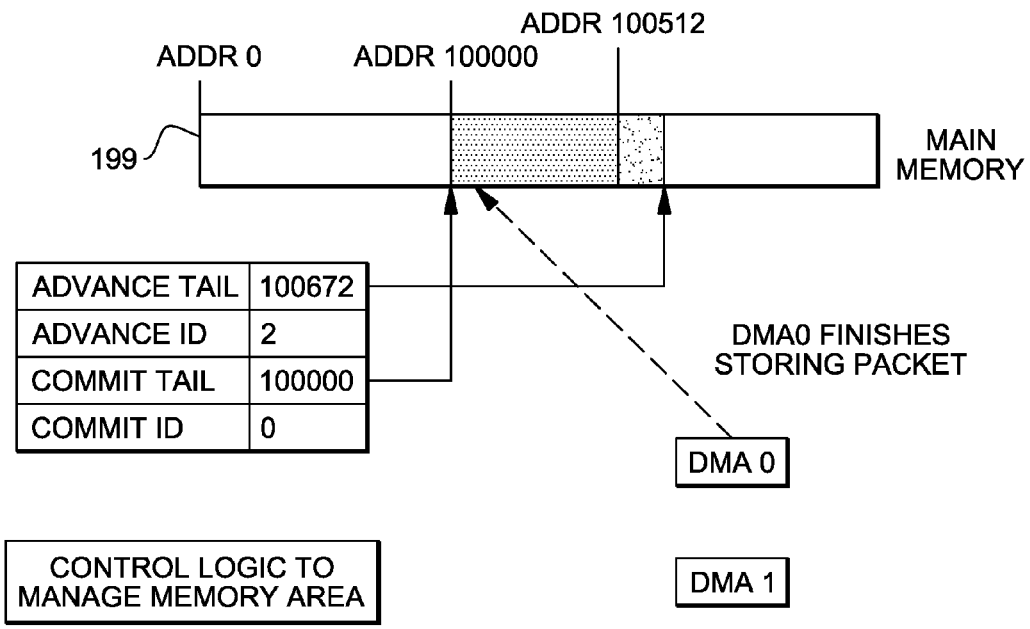
Figure 7L:
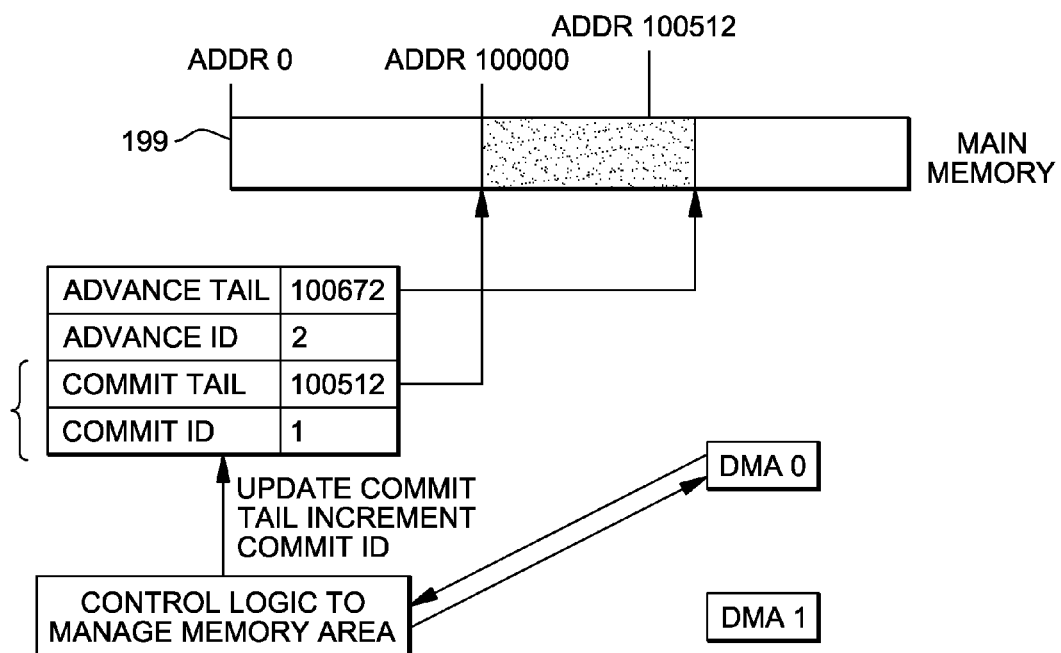
Figure 7M:
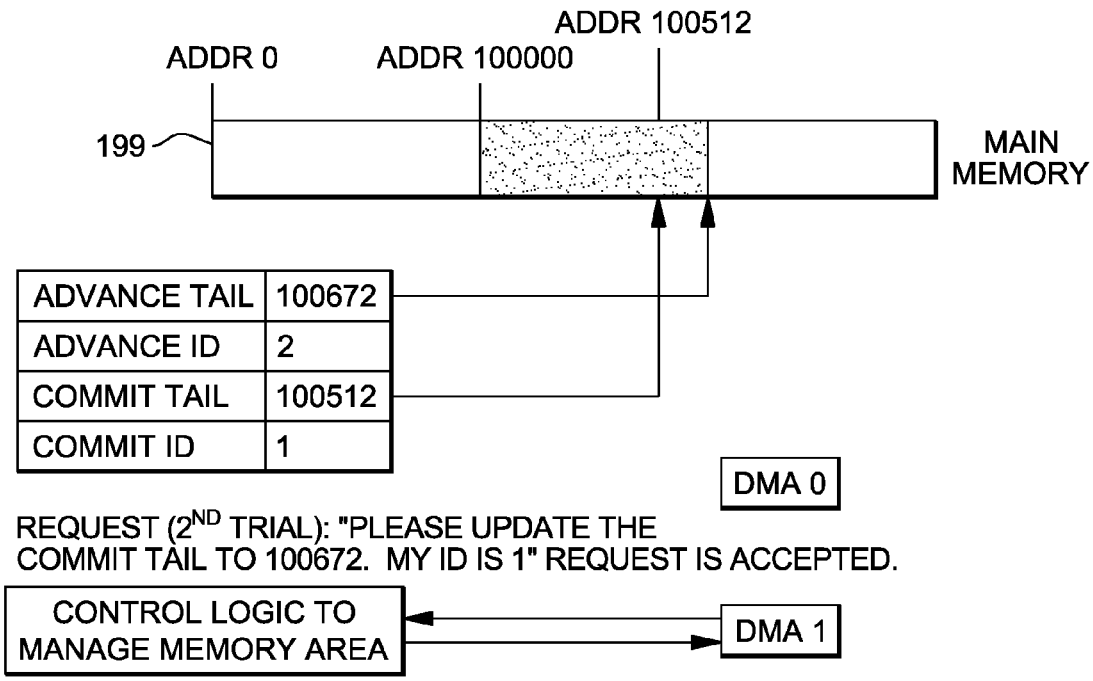
Figure 7N:
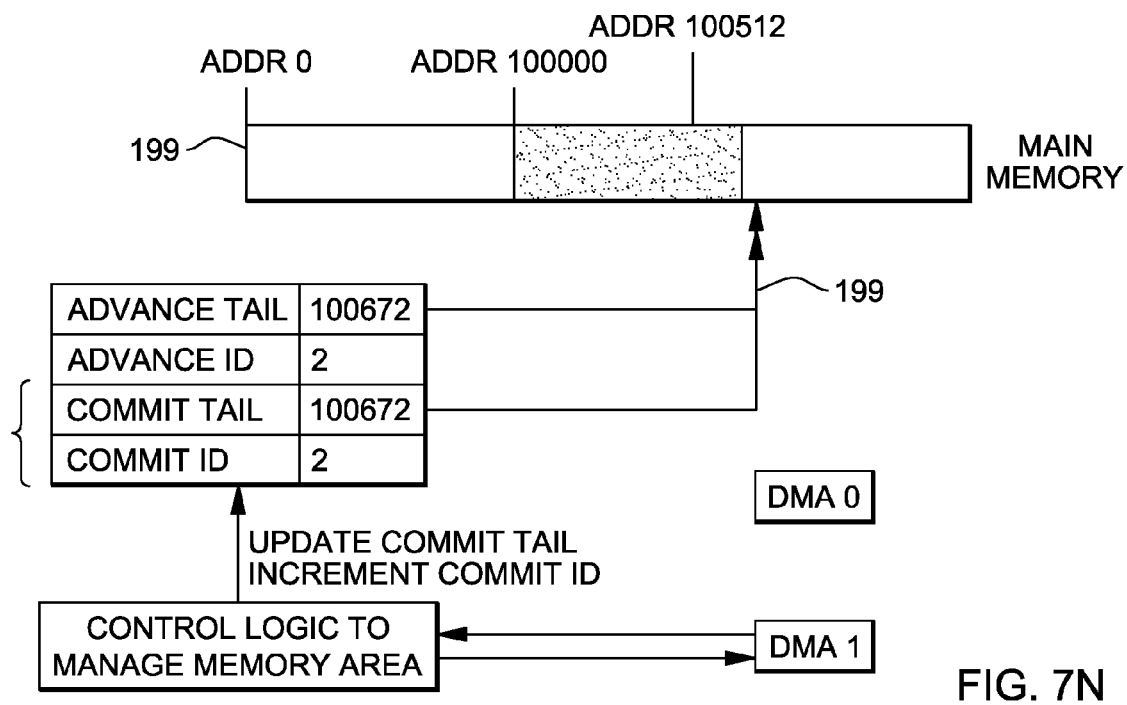

FIGS. 7A-7N depict example scenario for parallel DMA handling of received packets belonging to the same rmFIFO. In an example operation, as shown in FIG. 7A, in an initial state, commit tail=advance tail (address 100000), and commit ID=advance ID. The following steps are performed for each rME $DMA_i$, I=0, 1, . . . , n), in each MU at a multiprocessor node or system any processing system having more than one DMA engine. The advance tail, advance ID, commit tail, and commit ID are shared among all DMAs.

As exemplified in FIG. 7B, DMA0 first requests of the control logic 165 managing the memory area, e.g., rmFIFO, to stores a 512B packet FIG. 7B, and in FIG. 7C, the control logic 165 replies to the rME (DMA 0), to store the packet at the advance tail address, e.g., 100000. Further, the DMA0 is assigned an advance tail ID of "0", for example. As further shown in FIG. 7D, the control logic 165 managing the memory area atomically updates the advance tail by the amount of bytes of the packet to be stored by DMA) (i.e., (100000+512=100512) and, as part of the same atomic operation, increments the advance tail ID (e.g. now assigned a value of "1"). FIG. 7E depicts the DMA0 initiating storing of the packet at address 100000.

As exemplified in FIG. 7F, a second DMA element, DMA1, then requests of the control logic 165 managing the memory area, e.g., rmFIFO, to store a 160B packet FIG. 7G, and the control logic 165 replies to the rME (DMA 0), to store the packet at the advance tail address, e.g., 100512. Further, the DMA1 is assigned an advance tail ID of "1", for example. As further shown in FIG. 7H, the control logic 165 managing the memory area atomically updates the advance tail by the amount of bytes of the packet to be stored by DMA) (i.e., (100512+160=100672) and, as part of the same atomic operation, increments the advance tail ID (e.g. now assigned a value of "2"). As shown in FIG. 7I, DMA1 starts storing the example 160B packet, with both the DMAs operating in parallel. The DMA1 completes storing the 160B packet before DMA0 and tries to update the commit tail before DMA0 by requesting the control logic to update the commit tail address to 100512+160=100672 and informing the control logic 165 that the DMA1 ID is 1. The control logic 165 detects that there is a pending DMA write before DMA1 (i.e., DMA0) and replies to DMA1 that commit ID is still 0 and that commit tail cannot be updated and has to wait and attempt subsequently as shown in FIG. 7J. Thus, as exemplified, the advance ID and commit ID for the DMAs are used by the control logic to detect this ordering violation. That is, in this detection, the control logic compares the current commit ID with the advance ID the requestor DMA has, i.e., a DMA (rME) obtains the advance ID when it gets advance tail. If there is a pending DMA before the requestor DMA, the commit ID does not match the requestor DMA's advance ID.

Continuing to FIG. 7K, it is shown that DMA0 has finished storing the packet and initiates atomic updating the commit tail address, e.g., to 100000+512=100512, for DMA) having ID is 0. FIG. 7L shows the updating of the commit tail and incrementing commit ID value. Then, as shown in FIG. 7M, the DMA1 tries to update the commit tail again. In this example, the request from DMA1, having a commit ID assigned a value of 1, is to update the commit tail to 100672. This time DMA1's request is accepted because there is no preceding DMA. Thus, the memory control logic 165 replies to DMA1 that as the commit ID is 1 that DMA1 can now turn to update commit tail as shown in FIG. 7N. Finally commit tail points to the correct location (i.e., next to the area DMA1's packet was stored).

It should be understood that the foregoing described algorithm holds for multiple DMA engine writes in any multiprocessing architecture. It holds even when all DMAs (e.g., DMA0 . . . 15) in respective rMEs configured to operate in parallel. In one embodiment, commit ID and advanced ID are 5 bit counters that roll-over to zero when they overflow. Further, in one embodiment, memory FIFOs are implemented as circular buffers with pointers (e.g. head and tail) that, when updated, must account for circular wrap conditions by using modular arithmetic, for example, to calculate the wrapped pointer address.

Figure 6A:
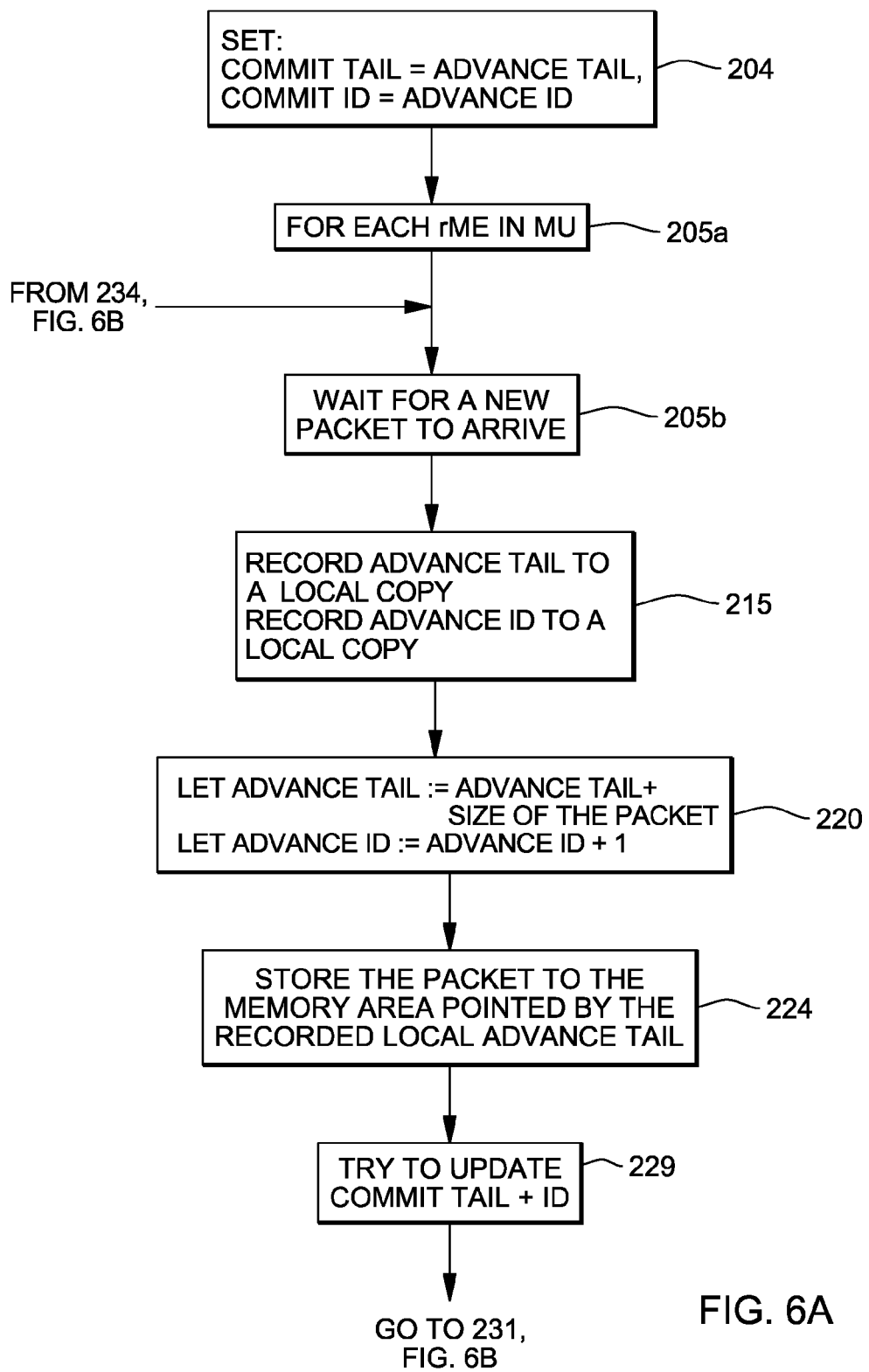
FIGS. 6A and 6B provide a flow chart describing the method 200 that every DMA (rME) performs in parallel for a general case (i.e. this flow chart holds for any number of DMAs FIG. 7 illustrates conceptually a reception memory FIFO 199 or like memory storage area showing a plurality of slots for storing packets in one aspect of the invention; and, FIGS. 7A-7N depict an example scenario for parallel DMA handling of received packets belonging to the same rmFIFO.
Figure 6B:
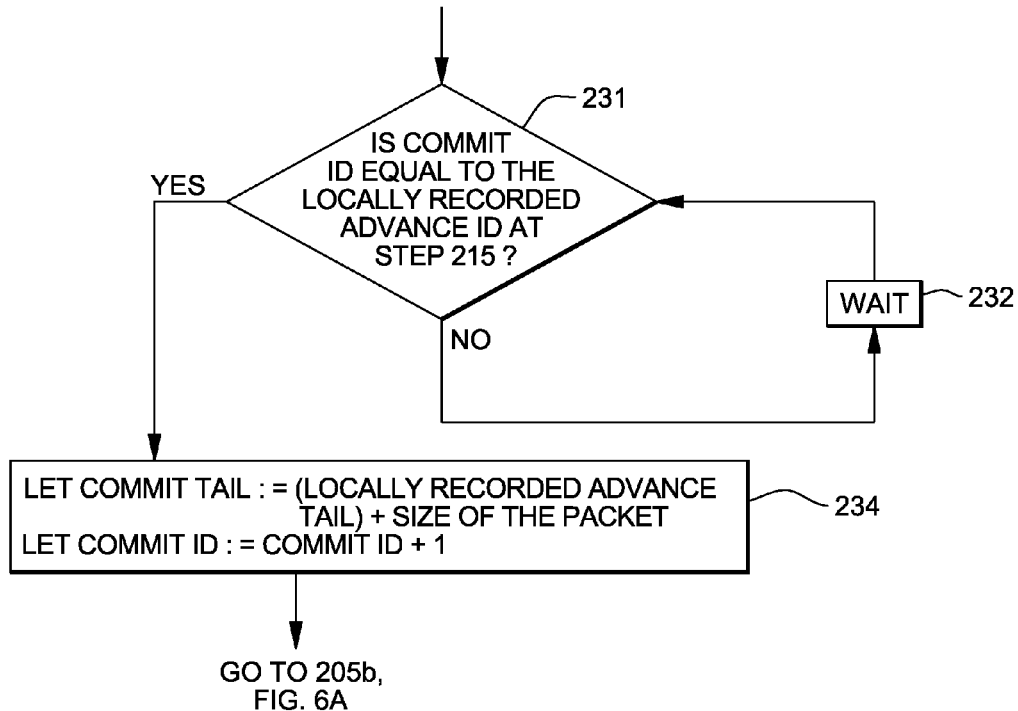

FIGS. 6A and 6B provide a flow chart describing the method 200 that every DMA (rME) performs in parallel for a general case (i.e. this flow chart holds for any number of DMAs). In a first step 204, there is performed setting of the "commit tail" address to the "advance tail" address and the setting of the "commit ID" equal to the "advance ID." Then, as indicated at 205*a* and 205*b*, each ME in MU performs a wait operation, or idle, until a new packet belonging to a message arrives at a reception FIFO to be transferred to the memory.

Once a packet of a particular byte length has arrived at a particular DMA engine (e.g., at an rME), then in 215, the globally maintained advance tail and advance ID are locally recorded by the DMA engine. Then, as indicated at 220, the advance tail is set equal to the advance tail+size of the packet being stored in memory, and, at the same time (atomically) advance ID is incremented, i.e., advance ID=advance ID+1, in the embodiment described. The packet is then stored to the memory area pointed to by the locally recorded advance tail in the manner as described herein at 224. At this point, an attempt is made to update the commit tail and commit tail ID at 229. Proceeding next to 231, FIG. 6B, a determination is made as to whether the commit ID is equal to the locally recorded advance ID from step 215 as detected by the control memory logic 165. If not, the DMA engine having just stored the packet in memory waits at 232 until the control memory logic has determined that prior stores to that rmFIFO of other DMAs have completed such that the memory control logic has updated commit ID to become equal to the advance ID of the waiting DMA. Then, after the commit ID becomes equal to the advance ID, the commit tail for that DMA engine is atomically updated and set equal to the locally recorded advance tail recorded plus the size of the stored packet, and the commit ID is incremented (atomically with the tail update), i.e., set equal to commit ID+1. Then, the process proceeds back to step 205*b*, FIG. 6A, where the reception FIFO waits for a new packet to arrive.

Thus, in a multiprocessing system comprising parallel operating distributed messaging units (MUs), each with multiple DMAs engines (messaging elements, MEs), packets destined for the same rmFIFO, or packets targeted to the same processor in a multiprocessor system could be received at different DMAs. To achieve high throughput, the packets can be processed in parallel on different DMAs.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention. The present invention may also include a computer program product for one or more functions of this invention. The computer program product includes a storage medium (e.g., a disk, optical disc, memory device, solid-state drive, etc.) readable by a processing circuit and storing instructions run by the processing circuit for performing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new, and desire to secure by Letters Patent is:

1. A system for receiving messages in a parallel computing device having a plurality of nodes, each node having multiple processor units and an associated memory operatively connected therewith via an interconnect device, said messaging system comprising at each node:
   a plurality of receiver devices for receiving message packets from a network,
   a network reception queue associated with a receiver device, each network reception queue adapted to buffer said received packet,
   a reception control unit for receiving information from a processor at a node for handling of packets received over a network; and,
   a plurality of DMA engine units, each unit operatively connected with the reception control unit and configured to operate in parallel, one DMA engine unit for transferring a current packet received at a network reception queue to a memory location in a reception memory FIFO (rmFIFO) of the associated memory based on said information,
   said control unit implementing logic to determine whether any prior received packet for that reception memory FIFO is still in a process of being stored in said associated memory by another DMA engine unit of said plurality, and prevent said one DMA engine unit to indicate completion of storing said current packet until all prior received packets associated with that reception memory FIFO are completely stored by said other DMA engine units,
   wherein multiple packets destined to a single rmFIFO are transferred and stored in parallel to predetermined locations in said associated memory.

2. The system as claimed in claim 1, wherein said information specified by said control unit includes address pointers to locations in the associated memory where data received from a current packet is to be stored, said pointers including a first pointer specifying a location starting address of a next packet in the reception memory FIFO and, a second pointer that indicates complete storing of that packet, wherein, said one DMA engine unit accessing said control unit to request update of a corresponding second pointer when storage of said current received packet is completed by that DMA engine,
   said control unit logic configured to track using said first and second pointers whether any prior received packet associated with that reception memory FIFO is still in a process of being stored in said memory, and preventing said one DMA engine unit to update said second pointer until all prior received packets for that reception memory FIFO are completely stored by a DMA engine.

3. The system as claimed in claim 2, wherein said control unit further specifies: a first counter value corresponding to said first pointer, wherein upon receiving a packet, said one DMA engine accessing said control unit to further record a local copy of a current first pointer and a corresponding local copy of a current first counter value.

4. The system as claimed in claim 3, wherein in response to each DMA request to store a packet associated with said reception memory FIFO, said control unit configured to update said current first pointer to include said the number of bytes in the current packet being stored in memory; and, incrementing said current first counter value.

5. The system as claimed in claim 4, wherein said control unit further specifies a second counter value corresponding to said second pointer, wherein upon completion of a current packet store by a DMA engine, said DMA engine requests said control unit to update said second pointer to point to said locally recorded first pointer plus a size of the stored packet, and increment said second counter.

6. The system as claimed in claim 5, wherein after all received packets are stored by one or more of said DMA engines, said control unit updating said second pointer and second counter values to equal said first pointer and corresponding first counter value.

7. The system as claimed in claim 5, wherein said DMA engine request to said control unit includes an indication of the locally recorded first counter value, and, in response to a DMA engine request, said control unit determining whether any prior received packet associated with that reception memory FIFO is still in a process of being stored.

8. The system as claimed in claim 7, wherein said determining includes comparing, by said control unit, the current second counter value with the locally recorded current first counter value obtained from said DMA engine; and, if the second counter value does not match the requestor DMA engine's locally recorded first counter value, then a pending DMA engine request has been received before the requestor DMA engine.

9. The system as claimed in claim 7, wherein, in response to determining that a pending DMA engine request has been received before the requestor DMA, said control unit forcing said requestor DMA engine to wait until said second counter value matches the requestor DMA engine's locally recorded first counter value.

10. The system as claimed in claim 7, wherein a received packet type specifies storage at a location in main memory, said reception messaging unit further calculating a destination address in a main memory and moving data of the received packet from a network reception queue to said destination address in the main memory.

11. The system as claimed in claim 1, further comprising:
an interconnect device having one or more ports for coupling each said at least one DMA engine with said interconnect device, said interconnect device configured to arbitrate requests from each said at least one DMA engine to assign access to a switch port; and,
writing packet data from said network reception queues to memory locations for said rmFIFO via at least one switch port, in parallel.

12. A method for receiving messages in a parallel computing system having a plurality of nodes, each node having multiple processor units and an associated memory operatively connected therewith via an interconnect device, said method comprising:
receiving, at a network receiver device of a plurality of network receiver devices, a current packet associated with a message and storing said packet at a network reception queue;
accessing, by at least one parallel operating DMA engine unit of a plurality of DMA engine units, a reception control unit providing information from a processor at a node for handling of packets received over a network; and,
transferring, via one of said at least one parallel operating DMA engine unit, the current received packet from the network reception queue to a memory location in a reception memory FIFO (rmFIFO) of the associated processor memory based on said information;
implementing logic, at said control unit, to determine whether any prior received packet associated with that rmFIFO is still in a process of being stored in said associated memory by another DMA engine unit of said at least one DMA engine units; and,
preventing the one of said at least one parallel operating DMA engine unit to indicate completion of storing said current packet until all prior received packets associated with that rmFIFO are completely stored by said other DMA engine units,
wherein multiple packets belonging to a single rmFIFO are transferred and stored in parallel to predetermined locations in said associated memory.

13. The method as claimed in claim 12, wherein said information specified by said control unit includes address pointers to locations in the associated memory where data received from a current packet is to be stored, said pointers including a first pointer specifying a location starting address of a next packet in the reception memory FIFO and, a second pointer that indicates complete storing of that packet, said method further comprising:
accessing, by said one of said at least one parallel operating DMA engine unit, said control unit to request updating of a corresponding second pointer when storage of said current received packet is completed by that DMA engine unit,
determining, by said control unit logic, using said first and second pointers whether any prior received packet associated with that rmFIFO is still in a process of being stored in said memory, and
preventing said one DMA engine unit to update said second pointer until all prior received packets for that reception memory FIFO are completely stored by a DMA engine.

14. The method as claimed in claim 13, wherein said control unit further comprises: a first counter value corresponding to said first pointer, wherein upon receiving a packet, said DMA engine accessing said control unit to further record a local copy of a current first pointer and a corresponding local copy of a current first counter value.

15. The method as claimed in claim 14, further comprising:
receiving, at said control unit, a request by a DMA engine to store said packet associated with said rmFIFO, wherein in response to each DMA request to store a packet, said control unit updating said current first pointer to include said the number of bytes in the current packet being stored in memory; and, incrementing said current first counter value.

16. The method as claimed in claim 15, wherein said control unit further comprises a second counter value corresponding to said second pointer, wherein upon completion of a current packet store by a DMA engine, requesting, by said DMA engine, said control unit to update said second pointer to point to said locally recorded first pointer plus a size of the stored packet, and request increment said second counter.

17. The method as claimed in claim 16, wherein after all prior received packets are stored by one or more of said DMA engines, said control unit updating said second pointer and second counter values to equal said first pointer and corresponding first counter value.

18. The method as claimed in claim 16, further comprising, indicating by said DMA engine, to said control unit the locally recorded current first counter value, and, in response to a DMA engine request, said control unit determining whether any prior received packet associated with that reception memory FIFO is still in a process of being stored.

19. The method as claimed in claim 18, wherein said determining includes: comparing, by said control unit, the current second counter value with the locally recorded current first counter value obtained from said DMA engine; and, if the second counter value does not match the requestor DMA engine's locally recorded first counter value, then a pending DMA engine request has been received before the current requestor DMA engine.

20. The method as claimed in claim 18, wherein, in response to determining that a pending DMA engine request has been received before the current requestor DMA, said control unit forcing said requestor DMA engine to wait until said second counter value matches the requestor DMA engine's first counter value.

21. The method as claimed in claim 12, wherein each associated DMA engine is coupled with said interconnect device having switch ports that provide a connection to said interconnect device, said method comprising:
- arbitrating requests from each said at least one DMA engine to assign access to at least one port; and,
- writing packet data from said network reception queues to said memory location for said rmFIFO via at least one port, in parallel,
- wherein at least two packets may be received and processed simultaneously for the same rmFIFO.

22. A computer program product for receiving messages in a parallel computing system having a plurality of nodes, each node having multiple processor units and an associated memory operatively connected therewith via an interconnect device, said computer program product comprising:
- a storage medium readable by a processing circuit and storing instructions for execution by the processing circuit for performing a method comprising:
  - receiving, at a network receiver device of a plurality of network receiver devices, a current packet associated with a message and storing said packet at a network reception queue;
  - accessing, by at least one parallel operating DMA engine unit of a plurality of DMA engine units, a reception control unit providing information from a processor at a node for handling of packets received over a network; and,
  - transferring, via one of said at least one parallel operating DMA engine unit, the current received packet from the network reception queue to a memory location in a reception memory FIFO (rmFIFO) of the associated processor memory based on said information;
  - implementing logic, at said control unit, to determine whether any prior received packet destined for that rmFIFO is still in a process of being stored in said associated memory by another DMA engine unit of said at least one DMA engine units; and,
  - preventing the one of said at least one parallel operating DMA engine unit to indicate completion of storing said current received packet until all prior received packets destined for that rmFIFO are completely stored by said other DMA engine units,
  - wherein multiple packets destined for that rmFIFO are transferred and stored in parallel to predetermined locations in said associated memory.

* * * * *